US009887989B2

(12) United States Patent
Corella et al.

(10) Patent No.: US 9,887,989 B2
(45) Date of Patent: Feb. 6, 2018

(54) PROTECTING PASSWORDS AND BIOMETRICS AGAINST BACK-END SECURITY BREACHES

(71) Applicants: Francisco Corella, Carmichael, CA (US); Karen Pomian Lewison, Carmichael, CA (US)

(72) Inventors: Francisco Corella, Carmichael, CA (US); Karen Pomian Lewison, Carmichael, CA (US)

(73) Assignee: Pomian & Corella, LLC, Carmichael, CA (US)

( * ) Notice: Subject to any disclaimer, the term of this patent is extended or adjusted under 35 U.S.C. 154(b) by 134 days.

(21) Appl. No.: 15/136,834

(22) Filed: Apr. 22, 2016

(65) Prior Publication Data

US 2016/0269393 A1   Sep. 15, 2016

Related U.S. Application Data

(63) Continuation-in-part of application No. 14/588,413, filed on Jan. 1, 2015, now abandoned, which is a
(Continued)

(51) Int. Cl.
  *H04L 29/06* (2006.01)
  *G06F 21/32* (2013.01)
  (Continued)

(52) U.S. Cl.
  CPC ............ *H04L 63/083* (2013.01); *G06F 21/32* (2013.01); *G06F 21/41* (2013.01); *H04L 9/0866* (2013.01);
(Continued)

(58) Field of Classification Search
  CPC ... H04L 63/083; H04L 9/3226; H04L 9/0866; H04L 9/3213; H04L 9/3236;
  (Continued)

(56) References Cited

U.S. PATENT DOCUMENTS 6,170,058 B1    2/2001  Kausik
7,139,917 B2 *  11/2006 Jablon .................. H04L 9/0844
                                                        713/183

(Continued)

OTHER PUBLICATIONS

Feng Hao, Ross Anderson and John Daugman, "Combining cryptography with biometrics effectively". Technical Report No. 640, Jul. 2005, Computer Laboratory, University of Cambridge, Cambridge, England.

(Continued)

*Primary Examiner* — John B King

(57) ABSTRACT

A method and system are provided for authenticating a user to an application back-end using a key pair and one or more bearer tokens such as a password, a biometric code, or a biometric key, while protecting the bearer tokens against back-end security breaches. In one embodiment, an application front-end authenticates the user by sending the bearer tokens and a public key to the application back-end, and demonstrating knowledge of a private key. The application back-end compares an authentication-phase tag derived from a joint hash of the public key and the bearer tokens against a registration-phase tag stored in a device record within a back-end database. The public key is not stored in the database, thereby depriving an adversary who breaches back-end security of information needed to test guesses of the bearer tokens.

18 Claims, 27 Drawing Sheets

Related U.S. Application Data continuation-in-part of application No. 14/016,022, filed on Aug. 30, 2013, which is a continuation-in-part of application No. 13/954,973, filed on Jul. 30, 2013, now Pat. No. 9,185,111, which is a continuation-in-part of application No. 13/925,824, filed on Jun. 24, 2013, now abandoned.

(60) Provisional application No. 61/936,860, filed on Feb. 6, 2014, provisional application No. 61/936,864, filed on Feb. 6, 2014, provisional application No. 61/947,401, filed on Mar. 3, 2014, provisional application No. 61/804,638, filed on Mar. 23, 2013, provisional application No. 61/809,790, filed on Apr. 8, 2013, provisional application No. 61/695,293, filed on Aug. 30, 2012, provisional application No. 61/663,569, filed on Jun. 23, 2012, provisional application No. 61/677,011, filed on Jul. 30, 2012.

(51) Int. Cl.
  *G06F 21/41* (2013.01)
  *H04L 9/32* (2006.01)
  *H04L 9/08* (2006.01)

(52) U.S. Cl.
  CPC .......... *H04L 9/3213* (2013.01); *H04L 9/3226* (2013.01); *H04L 9/3236* (2013.01); *H04L 9/3247* (2013.01); *H04L 63/045* (2013.01); *H04L 63/0807* (2013.01); *H04L 63/0861* (2013.01)

(58) Field of Classification Search
  CPC . H04L 9/3247; H04L 63/0861; H04L 63/045; H04L 63/0807; G06F 21/32; G06F 21/41
  See application file for complete search history.

(56) References Cited

U.S. PATENT DOCUMENTS

| | | | |
|---|---|---|---|
| 7,149,311 B2* | 12/2006 | MacKenzie | H04L 9/0894 380/277 |
| 7,328,350 B2 | 2/2008 | Hird | |
| 7,454,782 B2 | 11/2008 | Rajasekaran et al. | |
| 7,711,122 B2 | 5/2010 | Allen et al. | |
| 2001/0032310 A1* | 10/2001 | Corella | H04L 9/002 713/156 |
| 2013/0117567 A1* | 5/2013 | Chang | G06F 9/45558 713/170 |
| 2014/0006781 A1* | 1/2014 | Corella | H04L 63/0869 713/168 |
| 2014/0181931 A1 | 6/2014 | Bokarius et al. | |

OTHER PUBLICATIONS

Anil K. Jain, Karthik Nandakumar and Abhishek Nagar, "Biometric Template Security". In EURASIP Journal on Advances in Signal Processing, vol. 2008, Article ID 579416, Hindawi Publishing Corporation. Published online at http://www.asp.eurasipjournals.com/content/2008/1/579416. 2008.

C. Rathgeb and A. Uhl, "A Survey on Biometric Cryptosystems and Cancelable Biometrics". In EURASIP Journal on Information Security 2011:3. SpringerOpen. Published online at http://jis.eurasipjournals.springeropen.com/articles/10.1186/1687-417X-2011-3. 2011.

* cited by examiner

PROTECTING PASSWORDS AND BIOMETRICS AGAINST BACK-END SECURITY BREACHES

CROSS-REFERENCE TO RELATED APPLICATIONS

This application is a continuation in part of U.S. Non-Provisional Patent Application Ser. No. 14/588,413, filed on Jan. 1, 2015, which claims priority to U.S. Provisional Patent Application Ser. No. 61/936,860, filed on Feb. 6, 2014, U.S. Provisional Patent Application Ser. No. 61/936,864, filed on Feb. 6, 2014, and U.S. Provisional Patent Application Ser. No. 61/947,401, filed on Mar. 3, 2014, and is a continuation in part of U.S. Non-Provisional patent application Ser. No. 14/016,022, filed on Aug. 30, 2013, which claims priority to U.S. Provisional Patent Application Ser. No. 61/695,293, filed on Aug. 30, 2012, and is a continuation in part of U.S. Non-Provisional patent application Ser. No. 13/954,973, filed on Jul. 30, 2013, which is a continuation-in-part of U.S. Non-Provisional patent application Ser. No. 13/925,824, filed Jun. 24, 2013, which claims priority to U.S. Provisional Application Ser. No. 61/663,569, filed on Jun. 23, 2012, U.S. Provisional Application Ser. No. 61/677,011, filed on Jul. 30, 2012, U.S. Provisional Application Ser. No. 61/804,638, filed on Mar. 23, 2013, and U.S. Provisional Application Ser. No. 61/809,790, filed on Apr. 8, 2013, all of which applications are incorporated herein by reference.

BACKGROUND

Security breaches of databases containing user passwords occur frequently and are a major cybersecurity concern. As a mitigation against such breaches, best security practices call for storing salted hashes of passwords rather than plaintext passwords or simply hashes of passwords. A salted hash of a password is a joint hash of a password and a salt, the salt being stored together with the joint hash to enable verification. The purpose of the salt is to slow down a dictionary attack by an adversary who breaches the security of a user database and is able to read its contents. To check whether a password in the dictionary matches one of the salted hashes, the adversary has to hash it separately with each salt, whereas if the hashes are not salted, the adversary can hash the password once and compare the result to all the hashes in the database. But salting will not prevent any password whose salted hash is in the database from being cracked, if the password does not have uncommonly high entropy.

Cryptographic authentication is an alternative to authentication by password that is not vulnerable to a database breach. In cryptographic authentication, a user interacts with a front-end of an application running on a computing device and authenticates to a back-end of the application by demonstrating possession of a cryptographic credential stored in the computing device or in an ancillary device connected to the computing device. In the particular case where the application is a web application, the cryptographic credential may be stored in persistent local storage made available by a web browser to JavaScript front-end code of the web application, accessible via the JavaScript "local Storage" variable, in which case the browser-provided storage is known as HTML5 local storage, or via the Indexed DB API. ("HTML5" stands for HyperText Markup Language version 5, "DB" stands for Data Base, and "API" stands for "Application Program Interface".) In a common form of cryptographic authentication, the cryptographic credential is a key pair pertaining to a digital signature cryptosystem. The key pair comprises a private key and a public key, and the user demonstrates possession by using the private key to sign a challenge submitted by the application back-end. The application back-end verifies the signature using the public key, which may be included in a certificate that binds it a to a user's identity and is signed by a Certification Authority (CA), or may be registered by the application front-end with the application back-end and stored by the application back-end in a back-end database. In either case authentication is performed without the private key leaving the computing device or the ancillary device where it is stored. An adversary who breaches the security of the back-end database may gain knowledge of public keys but not of any private key, and therefore cannot use the knowledge obtained from the back-end database to impersonate any user vis-a-vis the application back-end.

But cryptographic authentication only establishes that the party that is authenticating has access to the device containing the private key. If the adversary gains possession of the computing device, he or she can authenticate to the application back-end. This drawback can be remedied by using a two-factor authentication scheme combining authentication by password with cryptographic authentication. An adversary who captures the computing device or the ancillary device where the cryptographic credential is stored may be able to demonstrate possession of the credential, but cannot authenticate without knowledge of the password. An adversary who breaches the security of the back-end database may be able to crack the password, but cannot impersonate a user without possession of the cryptographic credential.

However, although such two-factor authentication provides strong security against fraudulent authentication to the application back-end, it does not provide increased protection for the user's password. Even if the application back-end follows best practices and stores salted hashes of passwords in the back-end database, an adversary who breaches the security of the database and learns its contents will be able to crack most of the passwords whose salted hashes are in the database. The adversary will not be able to impersonate the users whose passwords have been cracked against the application back-end, but, since people commonly reuse passwords, he or she may be able to impersonate those users against other parties. The breached party may incur a high cost, both financial and in terms of reputation, as it reports the incident and compensates its users.

In a two-factor authentication scheme with a password and a key pair, in which a public key is registered with the application back-end and stored in the back-end database, the verifier may choose to hash the password with the public key rather than with a salt. This makes it unnecessary to generate a salt and to store the salt in addition to the public key, but it does not prevent an adversary who breaches the user database from mounting a dictionary attack against each password whose joint hash with a public key is stored in the database, and cracking all but those passwords with uncommonly high entropy.

Over the last few years, computing devices such as mobile phones and tablets have come to be equipped with a variety of sensors that can be used to measure biometric features of the user. This has led to authentication schemes where the user's computer device sends a biometric sample to the application back-end, which matches it against a biometric template. However, this raises privacy concerns because it may expose biometric information to an adversary who breaches the security of the back-end database, if biometric templates are stored in the database.

To address these privacy concerns, biometric authentication schemes have been proposed in which a biometric key and associated biometric helper data are generated at registration time from a biometric sample and random bits. The biometric key is later regenerated at authentication time from the biometric helper data and a genuine biometric sample. Because the biometric key and the biometric helper data are randomized, they can be changed if compromised, which amounts to a form of revocation of the randomized biometric key. Furthermore, it is deemed computationally infeasible to derive useful biometric information from the biometric helper data.

However, it has been observed in the paper "The Practical Subtleties of Biometric Key Generation", by Ballard et al., in the proceedings of the 17th USENIX Security Symposium, 2008, available at https://www.usenix.org/legacy/event/sec08/tech/full_papers/ballard/ballard.pdf, that biometric information may be computable from the biometric helper data in combination with the biometric key. Therefore, even though an adversary who breaches the security of the back-end database may not be able to obtain useful biometric information from biometric helper data stored in the database, the adversary may be able to obtain such information if he or she also captures the biometric key.

Passwords and biometrics are also vulnerable to other kinds of back-end security breaches besides security breaches that give the adversary access to the back-end database. In particular, if a back-end subsystem comprising the application back-end and the back-end database also comprises a reverse proxy, and if a secure connection from the application front-end to the application back-end is terminated at the reverse proxy that forwards decrypted data to the application back-end, a password or a biometric key sent by the application front-end to the application back-end could be captured by an adversary who breaches the security of the back-end subsystem as it travels in the clear from the reverse proxy to the application back-end.

Therefore there is a need for mitigating back-end security breaches to protect passwords and biometric information.

SUMMARY

In some embodiments, an application front-end authenticates a user to an application back-end by proving knowledge of a private key component of a key pair and sending an associated public key and one or more bearer tokens such as a password, a biometric key or a biometric token to the application back-end, which verifies the proof of knowledge and compares a tag derived from a joint hash of the public key and the bearer tokens against a tag previously computed during a registration phase and stored in a device record within a back-end database. An adversary who breaches the security of the database learns no information useful for testing guesses of the bearer tokens because the public key is not stored in the database. Additional mitigation of back-end security breaches is achieved in some embodiments by hashing a password or a biometric key with a salt before sending it to the application back-end as a bearer token.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Reference numerals consist of a concatenation of a one-or two-digit number referring to a figure, followed by a two-digit number that locates the referenced part within the figure. A reference numeral introduced in a figure may be used in other figures to refer to the same part or a similar part.

DETAILED DESCRIPTION

Figure 1:
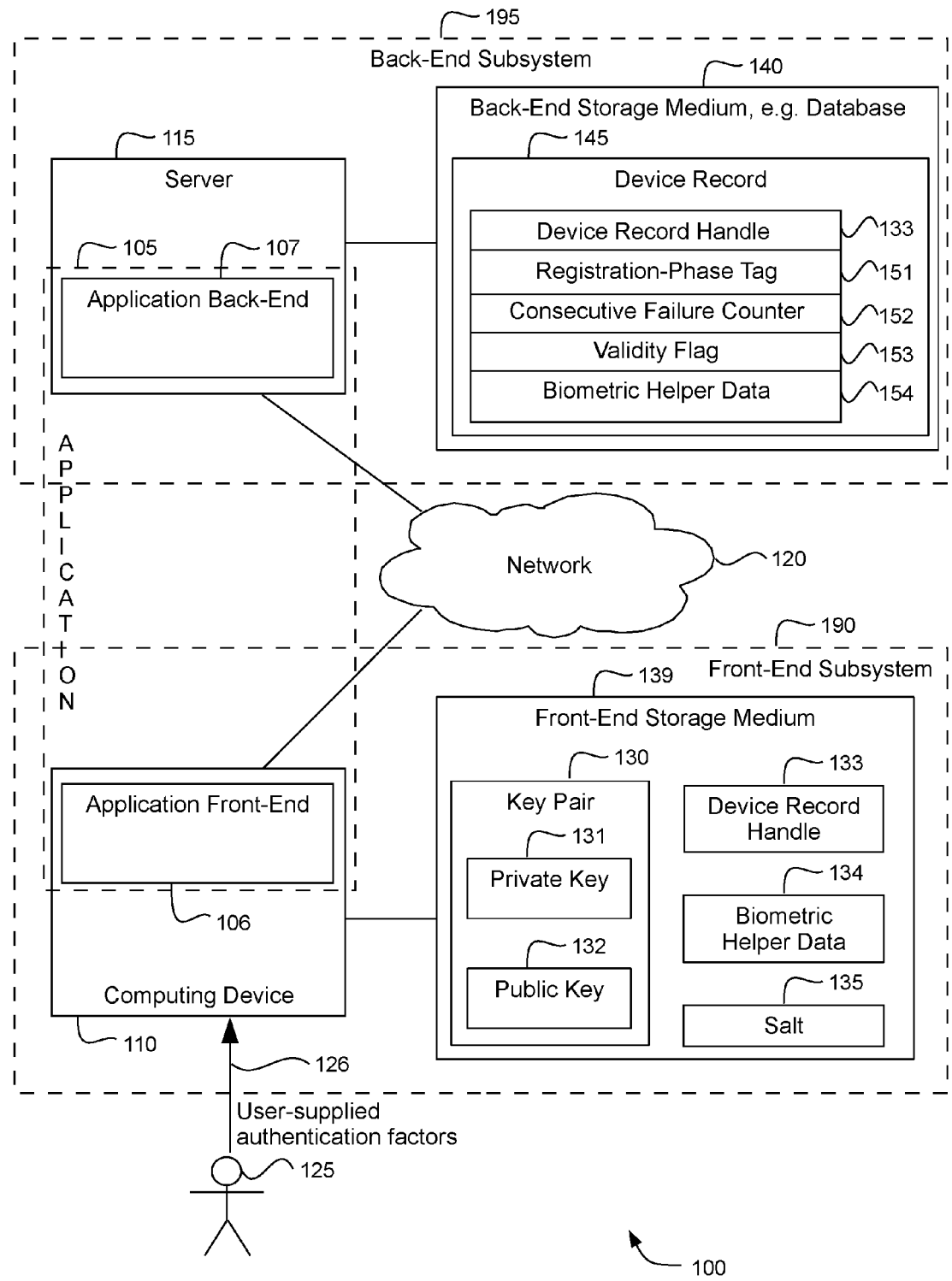
FIG. 1 is a block diagram of a system for protecting bearer tokens used in multifactor authentication against back-end security breaches.

This Detailed Description refers to the accompanying drawings, which are a part hereof and illustrate examples of embodiments of the invention. It is to be understood that other embodiments are possible, and that the features of different exemplary embodiments can be combined together unless otherwise stated.

The following definitions are intended to make more precise the meaning of the specification.

The acronym SQL stands for "Structured Query Language" and refers to the data management language used in a relational database. A non-SQL database is a database that is not implemented according to the relational data model.

A record handle is a data item contained in a database record that uniquely identifies the record. An example of a record handle is what is called a primary key in relational database terminology.

The term "random" is used herein broadly to refer to bits or data that are generated by a random or pseudo-random generator. Specifications for the implementation of random bit generators can be found in Special Publications SP 800-90 A, B and C of the National Institute of Standards and Technology (NIST).

The word "tag" is used herein to refer to a data item that is used in an equality comparison during authentication.

A "joint hash" of two or more data items is a value computed by applying a one-way function to one or more arguments that are derived from the data items. A single argument of the one-way function may be derived from all the two or more data items, or different arguments may be derived from various subsets of the two or more data items. Examples of one-way functions include a cryptographic hash function, which takes one argument, a keyed hash function, which takes two arguments, and a key derivation function, which takes multiple arguments. Examples of cryptographic hash functions include SHA-224, SHA-256, SHA-384, SHA-512 and SHA-3. Examples of keyed hash functions include those constructed from cryptographic hash functions according to the HMAC specification and those constructed from block ciphers according to the CBC-MAC specification. Examples of key derivation functions include those constructed from cryptographic hash functions according to the HKDF specification and those constructed from pseudo-random functions according to the PBKDF2 specification. The acronym SHA stands for "Secure Hash Function". The acronym HMAC stands for "Hash-based Message Authentication Code". The acronym CBC-MAC stands for "Cipher-Block-Chaining-Message-Authentication-Code". The acronym HKDF stands for "HMAC-based Key Derivation Function". The acronym PBKDF2 stands for "Password-Based Key Derivation Function-2".

"Deriving" a data item from one or more inputs means computing the data item from those inputs. A data item is said to be "derived" from one or more inputs if it can be computed from those inputs or if there is only one input and the data item has the same value as that input. In particular, "a tag derived from a joint hash" may be the joint hash itself.

A "salt" is a random data item that is jointly hashed with a password or a cryptographic key.

A "bearer token" is a data item that authenticates a party (the "bearer") to a verifier by the mere fact of being presented by the party to the verifier. An example of a bearer token is a password. A password may be numeric, in which case it may be called a "Personal Identification Number" (PIN). Other examples of bearer tokens include a biometric code and a biometric key.

A "biometric code" is defined as a parameter derived from a biometric sample by extracting information deemed useful for authenticating the user who provides the sample, using techniques specific to the biometric modality of the sample. A "genuine" biometric sample is defined as a biometric sample obtained from an authentic user rather than from an impostor. Two biometric codes extracted from different genuine biometric samples are expected to be similar but not necessarily identical.

A "biometric key" is defined as a special kind of biometric code that can be used as a cryptographic key because it can be consistently derived from genuine biometric samples. Two biometric keys derived from different but genuine biometric samples are expected to be identical.

Many methods of generating a biometric key are known in the art. Some of those derive a biometric key and associated biometric helper data during a registration phase from a registration-phase biometric sample and random bits. The biometric key is later regenerated during an authentication phase from the biometric helper data and an authentication-phase genuine biometric sample. Because the biometric key and the biometric helper data are randomized, they can be changed if compromised, which amounts to a form of revocation of the randomized biometric key. Furthermore, it is deemed computationally infeasible to derive useful biometric information from the biometric helper data without knowledge of the biometric key.

In the biometric literature the term "enrollment" is often used instead of "registration", but the term "registration" is used herein, because it is more commonly used in the cryptographic literature.

An example of a method of generating a randomized biometric key and associated biometric helper data can be found in the Technical Report No. 640 of the Computer Laboratory of the University of Cambridge, entitled "Combining cryptography with biometrics effectively", by Feng Hao, Ross Anderson and John Daugman, dated July 2005, a later version of which was published in the journal IEEE Transactions on Computers 2006, 55(9), pages 1081-1088. In that technical report, "iris codes" play the role of biometric codes, and biometric helper data is stored in a smart card. In FIG. 1 of the report, $\theta_{ref}$ and $\theta_{sam}$ are biometric codes, while $\theta_{lock}$ is biometric helper data. References to other examples of methods of generating a randomized biometric key can be found in the survey article "Biometric Template Security", by Anil K. Jain, Karthik Nandakumar and Abhishek Nagar, EURASIP Journal on Advances in Signal Processing 2008:579416. Additional references can be found in the survey article "A Survey on Biometric Cryptosystems and Cancelable Biometrics", by C. Rathgeb and A. Uhl, EURASIP Journal on Information Security 2011:3.

Methods of generating a non-randomized biometric key directly from a biometric sample or a biometric code without making use of associated helper data can also be found in the art. An example of such a method is described in the paper "Generalized Optimal Thresholding for Biometric Key Generation Using Face Images", by Wende Zhang and Tsuhan Zheng, IEEE International Conference on Image Processing, vol. 3, pages 784-787, 2005, a version of which is available online at http://chenlab.ece.cornell.edu/Publication/Wende/ICIP2005_wende.pdf. Another example is described in the paper "Computation of Cryptographic Keys from Face Biometrics", by Alwyn Goh and David Ngo, Proceedings of Communications and Multimedia Security, Advanced Techniques for Network and Data Protection: 7th IFIP-TC6 TC11 International Conference, CMS 2003, Torino, Italy, 2003, Springer Lecture Notes in Computer Science 2828, pages 1-3.

FIG. 1 is a block diagram illustrating a system 100 for protecting bearer tokens used in multifactor authentication against back-end security breaches, according to some embodiments. The system 100 comprises a front-end subsystem 190 and a back-end subsystem 195. An application 105 comprises an application front-end 106 running on a computing device 110 in the front-end subsystem and an application back-end 107 running on a server 115 in the back-end subsystem. The server 115 may be a physical server computer or a virtual server implemented by a hypervisor running on a physical computer, in various embodiments. The application back-end may be distributed over a server farm in other embodiments. A network 120 such as the Internet connects the computing device 110 to the server 115. A user 125 uses the application by interacting with the application front-end running on the computing device. The computing device may be, e.g., a desktop, a laptop, a tablet, a smart phone, a game console, or a home appliance, and the user may interact with the computing device by making use of any kind of input and output means, e.g., a keyboard, a mouse, a display, a touch screen, a microphone, speakers or motion sensors. In some embodiments the computing device may be a voice-controlled device with no input means other a microphone and no output means other than speakers.

In some embodiments the application front-end stores a key pair 130 in a front-end storage medium 139 within the front-end subsystem 190. In alternative embodiments the key pair 130 is not stored anywhere; instead, it is regenerated on demand from a protocredential and non-stored secrets supplied by the user 125. In some embodiments, the front-end storage medium contains a device record handle 133 that uniquely identifies a device record in the back-end subsystem. In various embodiments the front-end storage medium may also contain biometric helper data 134, a salt 135, or both.

In various embodiments the front-end storage medium may be located in the computing device itself or, as illustrated in the figure, it may be separate from the computing device. In embodiments in which it is located in the computing device, the front-end storage medium may be private storage of a native application, or local storage provided by a web browser, or storage controlled by the secure operating system of a Trusted Execution Environment (TEE), or tamper resistant storage located within a secure element or a Trusted Platform Module (TPM). In embodiments in which the front-end storage is separate from the computing device, it may be located in an ancillary device such as a dongle plugged into a Universal Serial Bus (USB) port of the computing device, a smart card plugged into a card reader connected to the computing device, a smart card that communicates with the computing device over a Near Field Communication (NFC) channel, or any other ancillary device that communicates with the computing device via a wireless or wired network, a point-to-point link, or a direct physical connection.

In some embodiments there may be additional users besides user 125 that use the same application 105 on the same device 110, each having a separate user account at the application. There may then be additional key pairs and additional record handles for those users in the same or different front-end storage media.

Whether stored or regenerated on demand, the key pair 130 pertains to an asymmetric cryptosystem (a.k.a. a public key cryptosystem) and comprises a private key 131 and a public key 132, which are components of the key pair and are mathematically associated with each other as specified by the cryptosystem. Any asymmetric cryptosystem may be used in the present invention, including without limitation Rivest-Shamir-Adleman (RSA), the Digital Signature Algorithm (DSA), the Elliptic-Curve Digital Signature Algorithm (ECDSA), and Diffie-Hellman (DH).

Conventionally, the public key portion of a key pair is treated as public information, and is often bound to a user's identity or attributes by a digital certificate signed by a Certificate Authority, which is also treated as public information. In the present invention, by contrast, the public key is treated unconventionally as a shared secret between the application front-end and the application back-end. The public key is not certified, and it is never communicated by the application front-end or the application back-end to any third party.

The application front-end uses the key pair as one authentication factor as it authenticates the user 125 to the application back-end, in conjunction with one or more additional authentication factors 126 supplied by the user. The application front-end demonstrates to the application back-end that the user has access to the front-end storage medium that contains the key pair by sending the public key and proving knowledge of the associated private key. In embodiments where the asymmetric cryptosystem is a digital signature cryptosystem such as DSA or ECDSA, the application front-end proves knowledge of the private key by computing a signature with the private key and sending it to the application back-end. In embodiments where the asymmetric cryptosystem is a key-exchange cryptosystem such as Diffie-Hellman, the application front-end proves knowledge of the private key by demonstrating that it is able to perform a key exchange resulting in a shared key with the application back-end. In embodiments where the asymmetric cryptosystem is an encryption cryptosystem, the application back-end proves knowledge of the private key by demonstrating that it is able to decrypt a nonce that the application back-end encrypts using the public key. RSA can be used both as a digital signature cryptosystem and as an encryption cryptosystem. In various embodiments in which the key pair pertains to the RSA cryptosystem, the application front-end demonstrates knowledge of the private key portion of the key pair by computing a signature with the private key and sending the signature to the application back-end, which the application back-end verifies using the public key portion of the key pair, or by decrypting a nonce that the application back-end has encrypted using the public key.

The additional authentication factors supplied by the user may consist of a password, one or more biometric samples, or both a password and one or more biometric samples, in various embodiments. The application front-end derives one or more bearer tokens from the user-supplied authentication factors and sends them to the application back-end. Separate bearer tokens may be derived from separate authentication factors, and a single bearer token may be derived from multiple authentication factors, in various embodiments. A bearer token derived from a password may be, e.g., the password itself, or an encoding of the password, or a joint hash of the password with a salt. A bearer token derived from a biometric sample may consist of, e.g., the biometric sample itself, a biometric code derived from the sample, or a randomized or unrandomized biometric key derived from the biometric sample or from a biometric code that is itself derived from the biometric sample.

The application back-end has access to a back-end storage medium 140, which is located within the back-end subsystem 195 and contains one or more device records referring to computing devices, such as device record 145 corresponding to the computing device 110. In some embodiments where additional users besides user 125 use the same application 105 on the same device 110, each having a separate user account at the application, there may be additional device records corresponding to the same computing device 110, one for each such user. In some embodiments where each user may access the same account with the application from separate devices, each device record may reference a user record containing user account data.

In various embodiments the back-end storage medium may be located within the server 115 or may be separate from the server as illustrated in the figure. The back-end storage medium may be, for example, a relational or non-SQL database located in the server, a relational or a non-SQL database located in a separate server or made available by a cloud service provider, a file system located in the server or in a separate storage device, or a persistent or non-persistent memory located in server 115 or in a separate server.

The device record 145 comprises the device record handle 133 also stored in the front-end storage medium 135, a registration-phase tag 151 derived from a joint hash of one or more bearer tokens and the public key 132 as further described below, a counter of consecutive authentication failures 152, and a boolean validity flag 153 indicating whether the record is valid. In some embodiments the record 145 further comprises biometric helper data 154.

The device record 145 is created when the application front-end 106 registers user 125 as a user of application 105 on device 110. At that time, the user submits one or more authentication factors such as a password or a biometric sample, from which the application front-end derives one or more bearer tokens, which it sends to the application back-end. In some embodiments in which the key pair 130 is generated by the application front-end, the application front-end also sends the public key 132 to the application back-end at that time. In other embodiments the key pair is generated by the application back-end and downloaded to the application front-end. In those embodiments there is no need for the application front-end to send the public key to the application back-end at registration time. In either kind of embodiment, the application back-end computes the registration-phase tag 151 and stores it the newly created device record, after which it deletes the public key and the registration-phase bearer tokens from the back-end subsystem 195. In embodiments in which the key pair is generated by the application back-end, the application back-end also deletes the private key from the back-end subsystem, after downloading the key pair to the application front-end. In the absence of the public key, an adversary who breaches the security of the back-end finds no information that could be used for testing guesses of the one or more bearer tokens. In particular, if one of the bearer tokens is a password, the adversary finds no information that would enable a dictionary attack against the password.

In some embodiments, the counter field 152 is used by the application back-end to limit the number of authentication attempts that can be made by an adversary who physically captures the key pair 130. The application back-end increments the count of consecutive authentication failures stored in field 152 after each authentication failure, and resets it to its initial value of 0 after each successful authentication. When the counter reaches a configured limit, such as 5, the application back-end disables the device record 145 by setting the validity flag stored in field 240 to "false", causing any further authentication attempts to be rejected. In some embodiments, there is no validity flag field, the user-device record being deleted rather than invalidated when the count reaches its configured limit.

Figure 2:
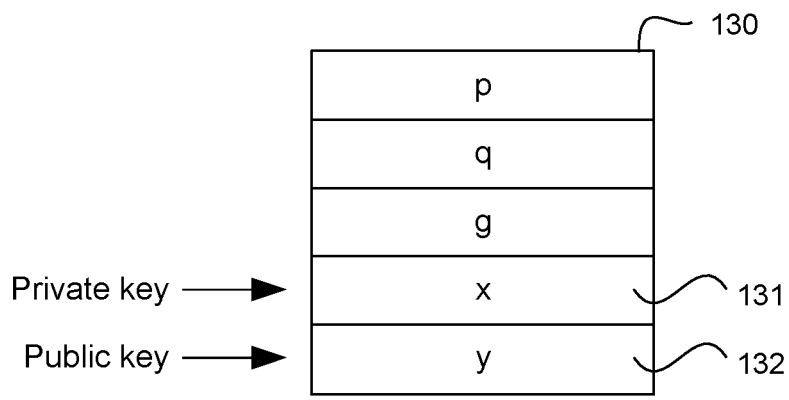
FIG. 2 is a block diagram of a DSA key pair whose domain parameters are publicly known and not considered part of the private and public keys.
Figure 3:
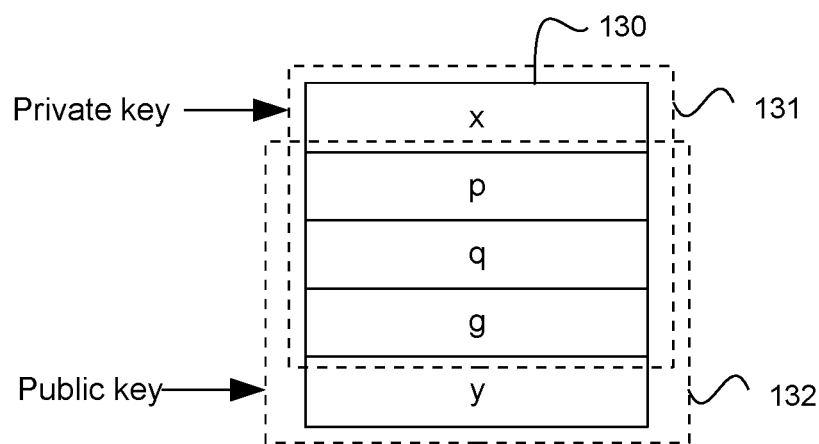
FIG. 3 is a block diagram of a DSA key pair whose domain parameters are considered part of both the private key and the public key.

FIGS. 2 and 3 are block diagrams of key pair 130 according to embodiments where the key pair pertains to the DSA digital signature asymmetric cryptosystem, as described in Section 4 and relevant appendices of the Digital Signature Standard (DSS), published by the National Institute of Standards and Technology (NIST) as Federal Information Processing Standard (FIPS) 186-4. Both figures use the notations of the DSS. The parameters p, q and g are domain parameters, which may be shared by multiple key pairs; x is a private parameter and y is a public parameter.

FIG. 2 illustrates some embodiments in which the domain parameters are publicly known and shared by multiple key pairs. In those embodiments the private key component 131 of the key pair is x, and the public key component 132 is y. Thus the tag stored in the field 151 of the device record 145 of FIG. 1 is derived in those embodiments from a joint hash of the one or more bearer tokens received from the application front-end and the parameter y.

FIG. 3 illustrates some embodiments in which each key pair has a different set of domain parameters. In those embodiments the private key and the public key overlap, the private key 131 comprising the parameters p, q, g and x, the public key 132 comprising the parameters p, q, g, and y. As discussed above, as part of the public key, the domain parameters p, q, g as well as the public parameter y are unconventionally treated as secrets shared between the application front-end and the application-back end rather than as public information. The tag in field 151 is derived in those embodiments from a joint hash of the one or more bearer tokens received from the application front-end and the public key parameters p, q, g and y.

Figure 4:
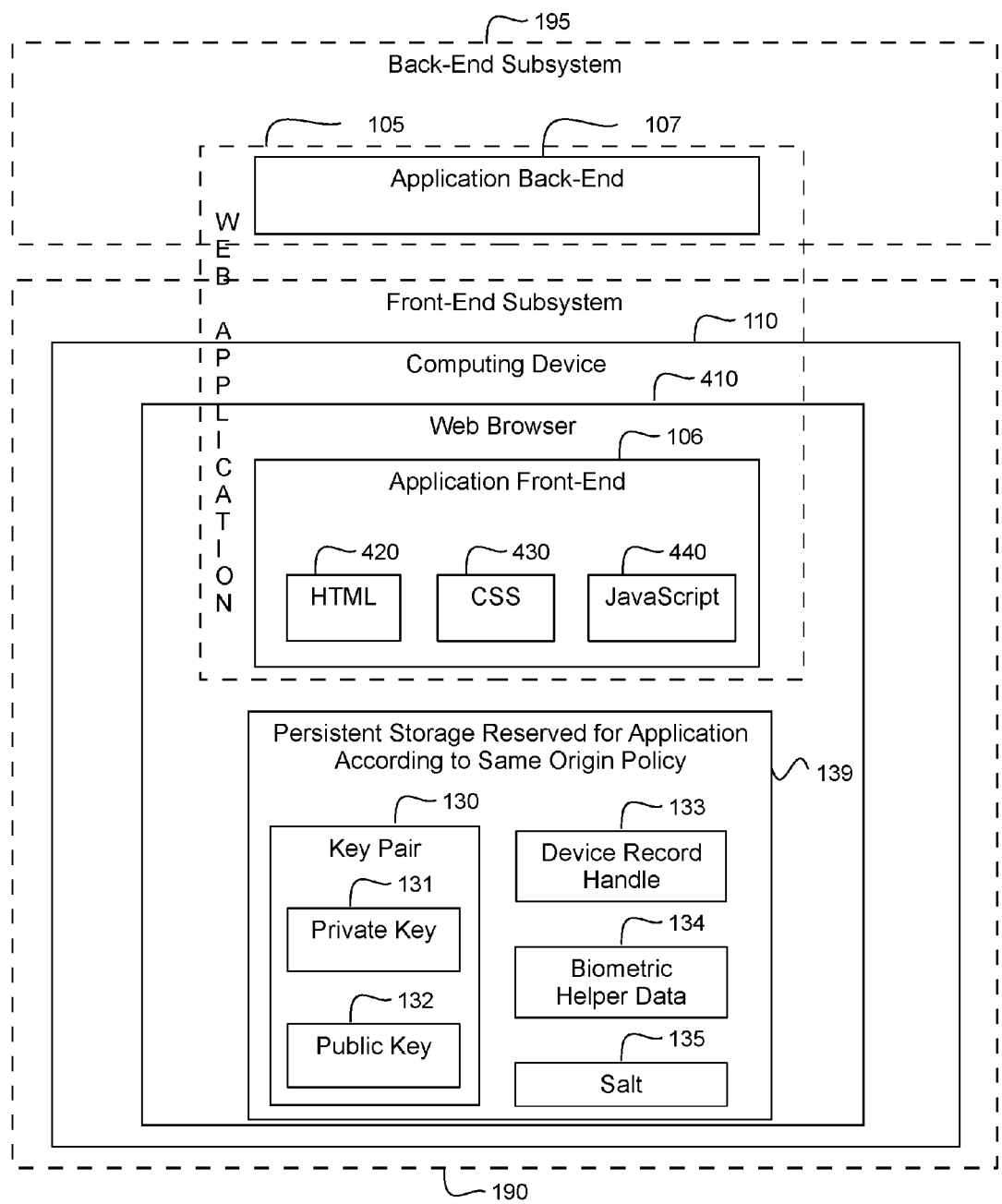
FIG. 4 is a block diagram of a system for protecting bearer tokens used for multifactor authentication in a web application.

FIG. 4 is a block diagram illustrating further details of system 100 according to embodiments in which the application 105 is a web application. The application front-end 106 runs in a web browser 410 and comprises HyperText Markup Language (HTML) code 420 and Cascading Style Sheets (CS S) code 430 used by the browser to render one or more web pages pertaining to the application, as well as JavaScript code 440 executed by a JavaScript engine that is part of the browser. The JavaScript code uses as the front-end storage medium 139 a persistent local storage made available by the browser, and reserved for exclusive use of the JavaScript code 440 according to a same origin policy implemented by the browser. In some embodiments the persistent local storage used as the front-end storage medium is a JavaScript object made available through the JavaScript localStorage global variable, while in other embodiments it is a non-SQL database accessible through the JavaScript IndexedDB API, both of which are well known to persons skilled in the art.

Figure 5:
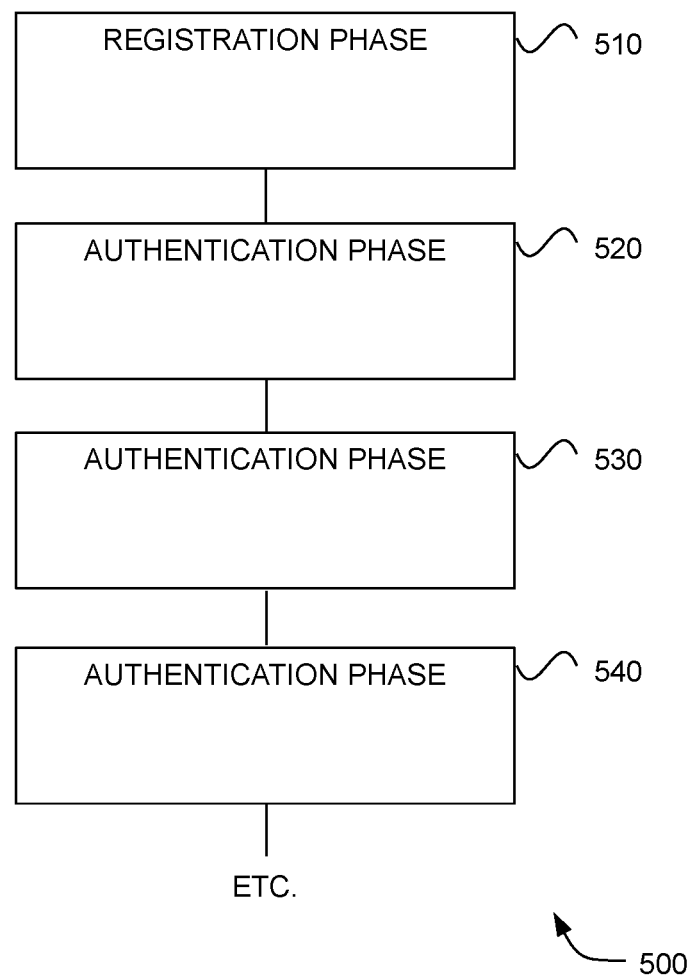
FIG. 5 is a flow diagram illustrating the registration phase and authentication phases of an authentication process.

FIG. 5 is a flow diagram generally illustrating a multi-factor authentication process 500 carried out between application front-end 106 and application back-end 107 according to some embodiments. The process comprises a registration phase 510 followed by any number of authentication phases, three of them, labeled 520, 530 and 540, being shown by way of example. Each phase consists of steps shown below in subsequent figures.

During the registration phase 510, the application front-end sends one or more registration-phase bearer tokens to the application back-end, derived from one or more authentication factors provided by the user. In various embodiments, it may or may not send the public key 132. The application back-end creates the device record 145 and stores in the record the registration-phase tag 151, derived from a joint hash of the public key and the one or more registration-phase bearer tokens.

During the authentication phase 520 and any other authentication phases, the application front-end sends one or more authentication-phase bearer tokens to the application back-end, derived from one or more authentication factors newly provided by the user. It also sends the public key 132 and proves knowledge of the associated private key 131. The application back-end verifies the proof of knowledge of the private key and computes an authentication-phase tag derived from a joint hash of the public key and the one or more authentication-phase bearer tokens, which it compares to the registration-phase tag 151 in the device record 145.

Figure 6:
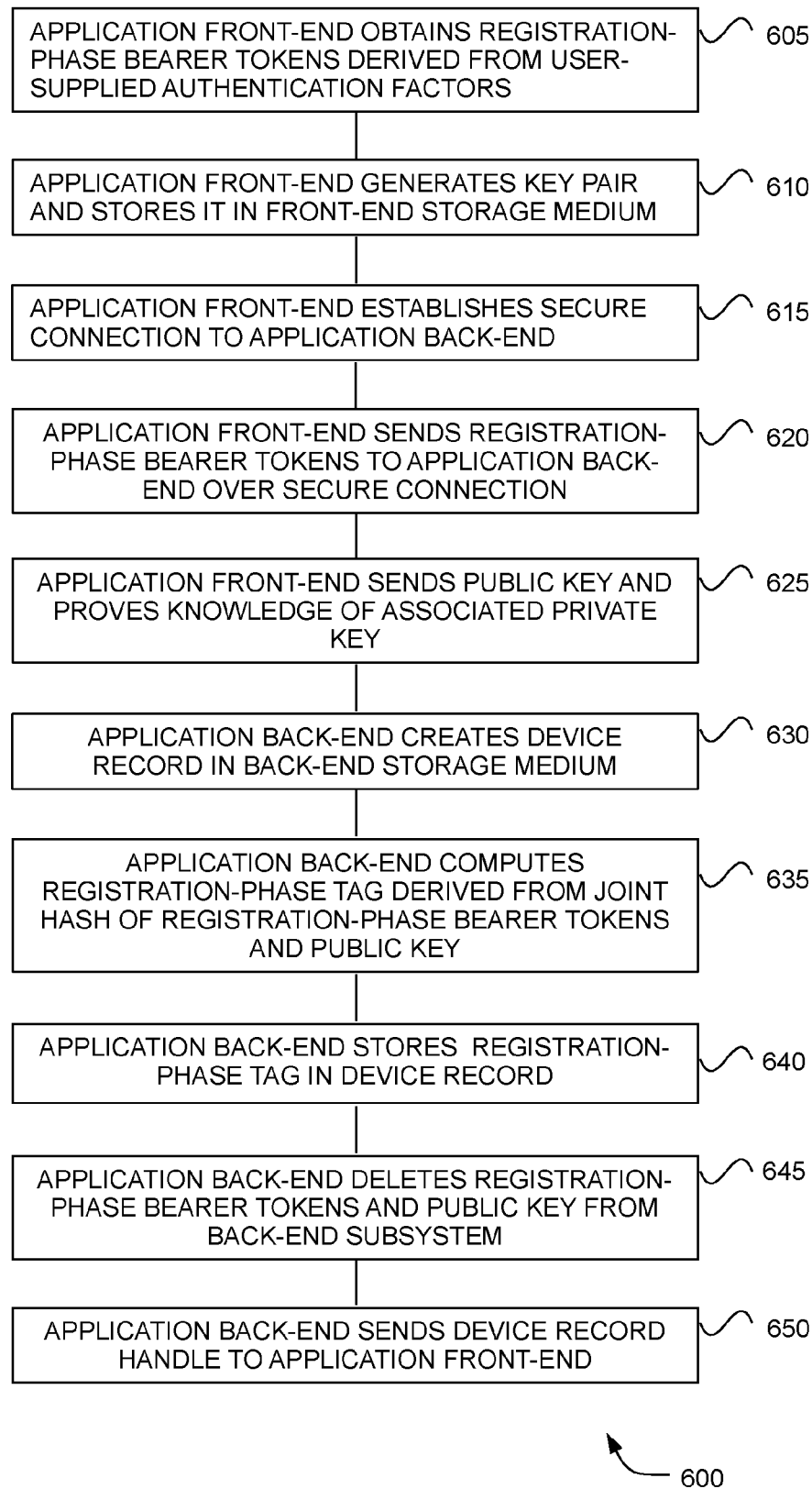
FIG. 6 is a flow diagram illustrating a process jointly performed by an application front-end and an application back-end during a registration phase.

FIG. 6 is a flow diagram illustrating a process 600 jointly performed by the application front-end 106 and the application back-end 107 during the registration phase 510 of FIG. 5, according to some embodiments.

At 605 the application front-end obtains one or more registration-phase bearer tokens derived from one or more authentication factors supplied by the user 125. Examples of such bearer tokens include a password supplied by the user, a biometric code extracted from a biometric sample supplied by the user, and a biometric key derived from a biometric sample or a biometric code. In some embodiments, the application front-end also computes helper data such as biometric helper data 134, or salt 135, or both, and stores the helper data in the front-end storage medium 139 for later use during authentication. Then the process continues at 610.

At 610 the application front-end generates the key pair 130 and stores it in the front-end storage medium 139. In some alternative embodiments, the application front-end stores instead a protocredential from which the key pair 130 can be regenerated on demand. In other alternative embodiments the key pair 130 is generated by the application back-end and sent to the application front-end, which stores it in the front-end storage medium. Then the process continues at 615.

At 615 the application front-end establishes a secure connection to the application back-end with unilateral authentication of the application back-end to the application front-end. In some embodiments the secure connection is a TLS connection established by a TLS handshake in which the application back-end authenticates in the role of TLS server to the application front-end. Then the process continues at 620.

At 620 the application front-end sends the one or more registration-phase bearer tokens to the application back-end over the secure connection. Then the process continues at 625.

At 625 the application front-end sends the public key 132 to the application back-end and proves knowledge of the associated private key 131. Then the process continues at 630.

At 630 the application back-end creates the device record 145 in the back-end storage medium 140, and stores in the device record a device record handle 133 that uniquely identifies the device record, a counter of consecutive authentication failures 152 initialized to zero, and a validity flag initialized to "true". Then the process continues at 635.

At 635 the application back-end computes the registration-phase tag 151, derived from a joint hash of the public key 132 and the one or more registration-phase bearer tokens received at step 620. In some embodiments, the application back-end also computes biometric helper data 154, which it stores in device record 145 for later use during authentication. Then the process continues at 640.

At 640 the application back-end stores the registration-phase tag 151 in the device record 145 within the back-end storage medium 140. Then the process continues at 645.

At 645 the application back-end deletes the public key 132 and the registration-phase bearer tokens used to compute the registration-phase tag from the back-end subsystem 195. Then the process continues at 650.

At 650 the application back-end sends the device record handle 133 to the application front-end. Then the registration phase terminates.

Figure 7:
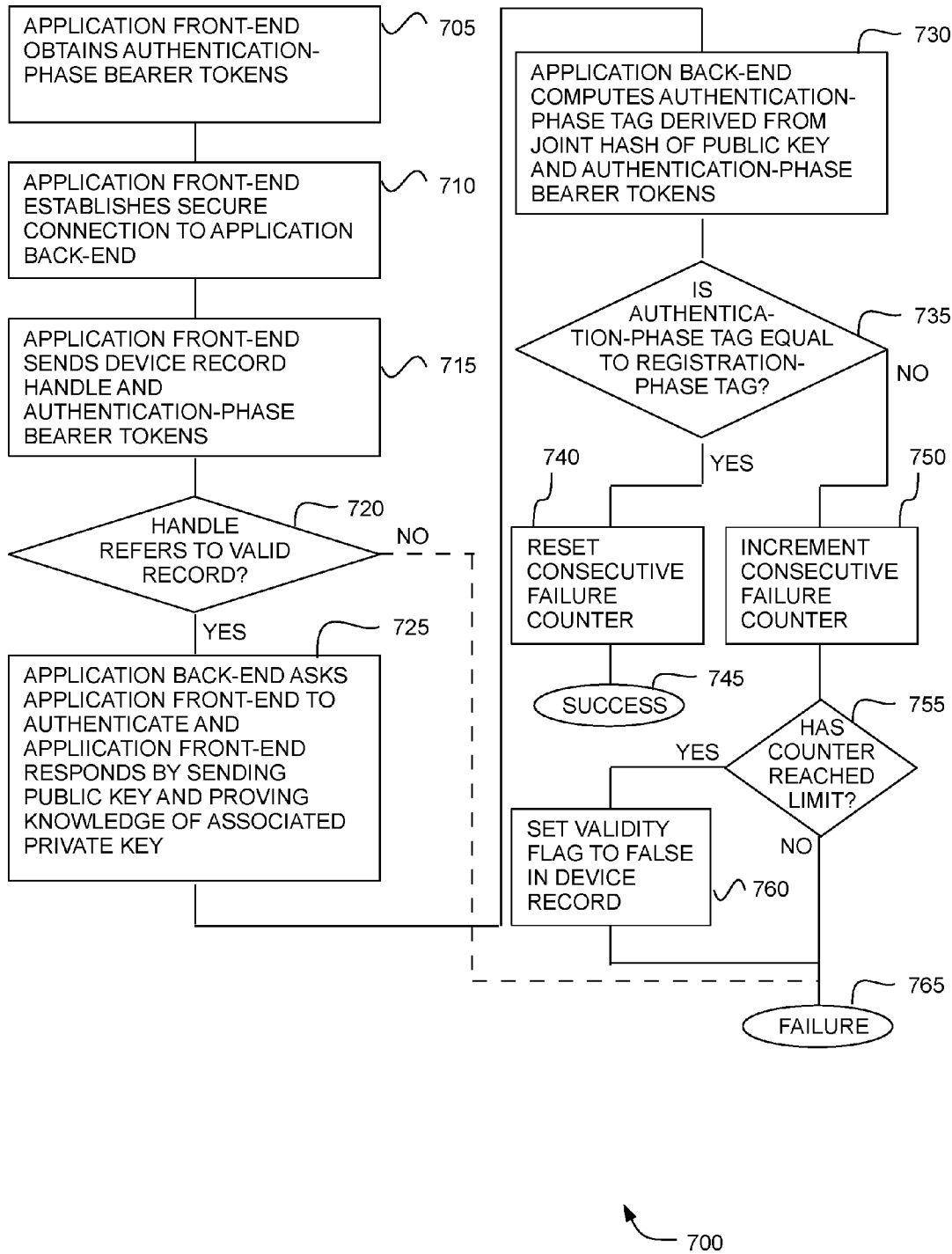
FIG. 7 is a flow diagram illustrating a process jointly performed by an application front-end and an application back-end during an authentication phase.

FIG. 7 is a flow diagram illustrating a process 700 jointly performed by the application front-end 106 and the application back-end 107 during the authentication phase 520 of FIG. 5 and other authentication phases, according to some embodiments.

At 705 the application front-end obtains one or more authentication-phase bearer tokens derived from one or more authentication factors newly supplied by the user 125. Then the process continues at 710.

At 710 the application front-end establishes a secure connection to the application back-end as in step 615 of the registration phase 510. Then the process continues at 715.

At 715 the application front-end sends the device record handle 133 and the one or more authentication-phase bearer tokens to the application back-end over the secure connection. Then the process continues at 720.

At 720 the application back-end looks in the back-end storage medium 140 for a device record that contains the device record handle 133 and also contains a validity flag 153 equal to "true". If such a device record 145 is found, the process continues at 725. Otherwise the process continues at 765.

At 725 the application back-end asks the application front-end to authenticate and the application front-end responds by sending the public key 132 and proving knowledge of the associated private key 131. Then the process continues at 730.

At 730 the application back-end computes an authentication-phase tag derived from a joint hash of the public key 132 and the one or more authentication-phase bearer tokens received at step 715. Then the process continues at 735.

At 735 the application back-end compares the authentication phase tag computed at step 730 to the registration-phase tag 151 found in device record 145. If the two tags coincide, the process continues at 740. Otherwise the process continues at 750.

At 740 the application back-end resets the counter 152 of consecutive authentication failures found in the device record 145 to its initial value 0. Then the process continues at 745.

At 745 the application back-end sends a message to the application front-end over the secure connection indicating that the user has been successfully authenticated. Then the authentication phase terminates.

At 750 the application back-end increments the count 152 of consecutive authentication failures in device record 145. Then the process continues at 755.

At 755 the application back-end compares the counter 152 of consecutive authentication failures found in device record 145 to its configured limit. If the count has reached the limit, the process continues at 760. Otherwise the process continues at 765.

At 760 the application back-end disables the device record 145 by setting the value of the validity flag field 153 to "false". Then the process continues at 765.

At 765 the application back-end sends a message to the application front-end over the secure connection indicating that authentication has failed. Then the authentication phase terminates.

Figure 8:
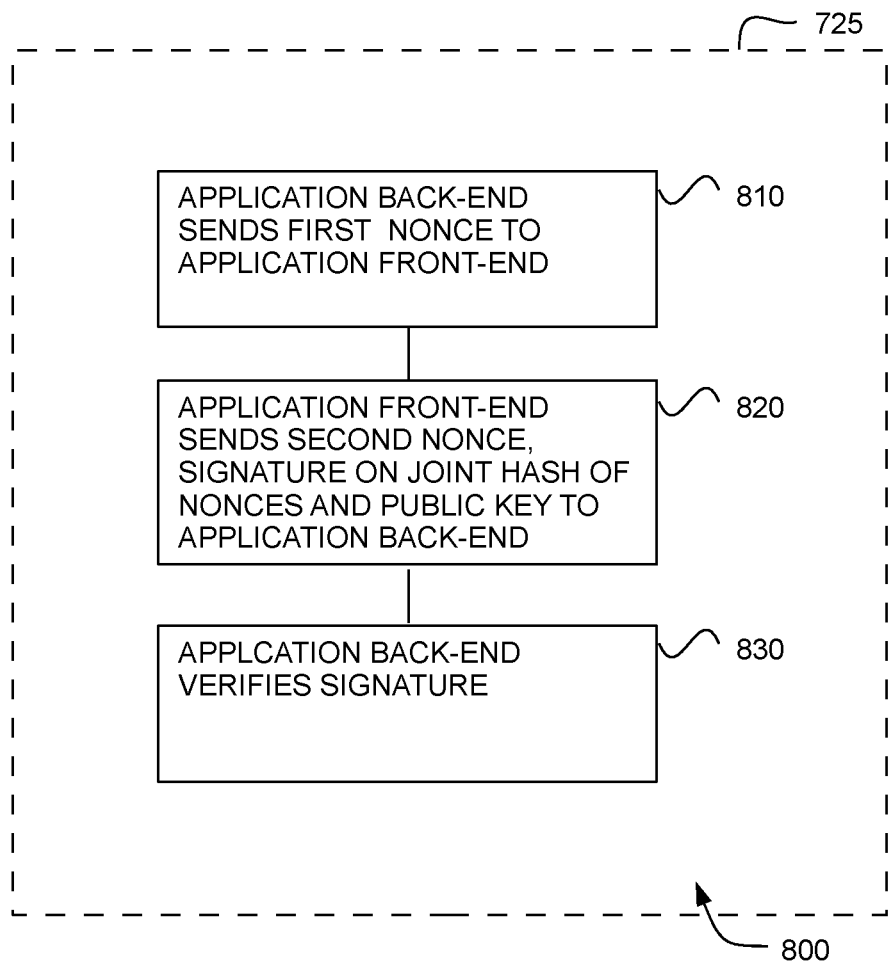
FIG. 8 is a flow diagram illustrating a process for proving knowledge of a private key pertaining to an asymmetric digital signature cryptosystem.

FIG. 8 is a flow diagram illustrating a process 800 used to implement step 725 of process 700 in some embodiments in which the key pair 130 pertains to an asymmetric digital signature cryptosystem.

At 810 the application back-end asks the application front-end to authenticate, generates a first random nonce, and sends the first random nonce to the application front-end over the secure connection established at step 710 of process 700. Then process 800 continues at 820.

At 820 the application front-end generates a second random nonce, computes a joint hash of both nonces, signs the joint hash with the private key, and sends the second random nonce, the signature, and the public key to the application back-end over the secure connection. In some embodiments in which the key pair 130 pertains to the DSA cryptosystem, the signature is computed as specified in Section 4 of the DSS and relevant appendices. Then process 800 continues at 830.

At 830 the application back-end computes the joint hash of both nonces and verifies the signature on the joint hash using the public key, concluding step 725 of process 700.

Figure 9:
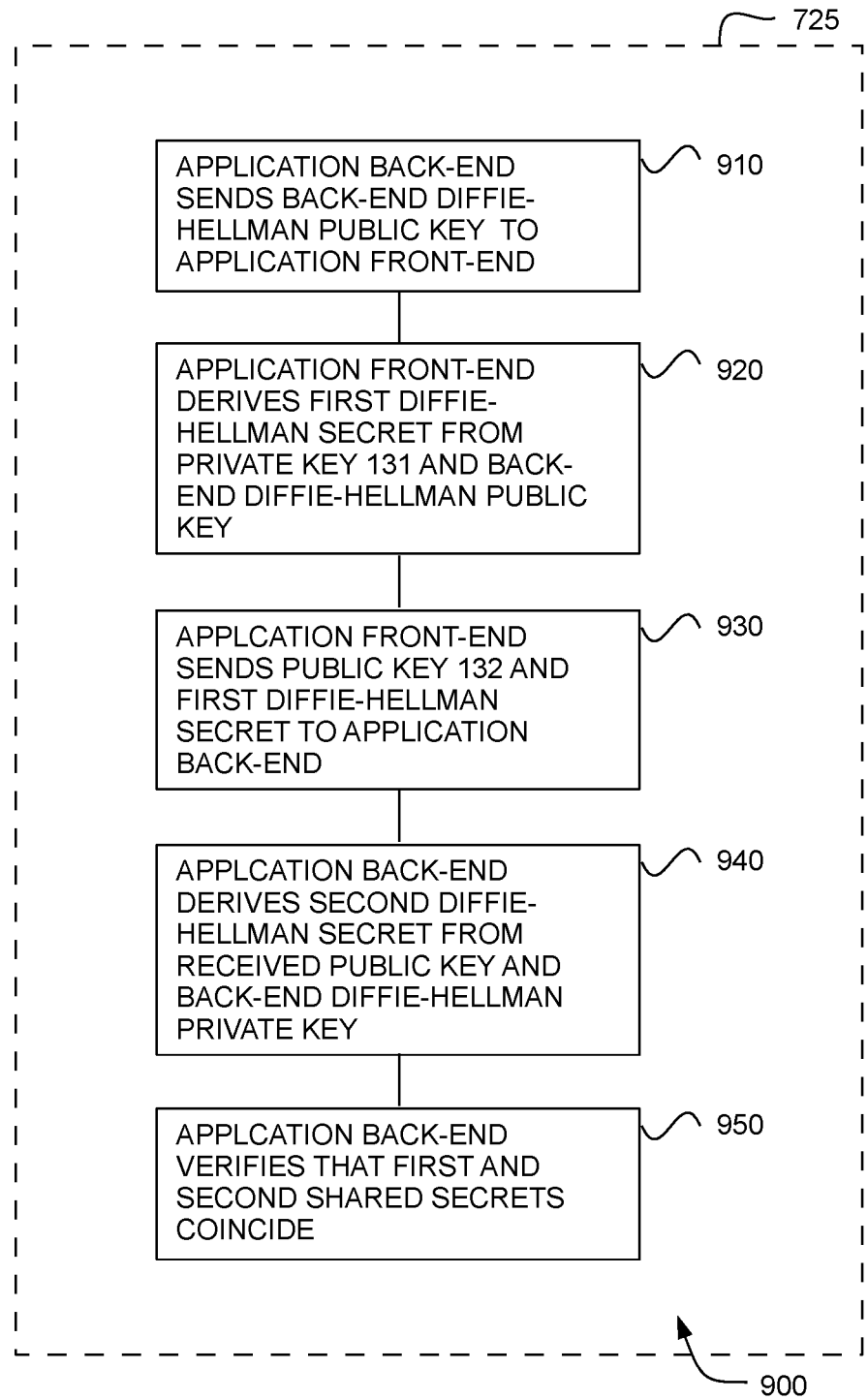
FIG. 9 is a flow diagram illustrating a process for proving knowledge of a private key pertaining to the Diffie-Hellman asymmetric key-exchange cryptosystem.

FIG. 9 is a flow diagram illustrating a process 900 used to implement step 725 of process 700 in some embodiments in which the key pair 130 pertains to the Diffie-Hellman asymmetric key exchange cryptosystem.

At 910 the application back-end asks the application front-end to authenticate and sends a back-end Diffie-Hellman public key to the application front-end over the secure connection established at step 710 of process 700. Then process 900 continues at 920.

At 920 the application front-end derives a first Diffie-Hellman shared secret from the private key 131 and the back-end Diffie-Hellman public key. Then process 900 continues at 930.

At 930 the application front-end sends the public key 132 and the first Diffie-Hellman shared secret to the application back-end over the secure connection. Then process 900 continues at 940.

At 940 the application back-end derives a second Diffie-Hellman shared secret from the public key received at step 930 and a back-end Diffie-Hellman private key associated with the back-end Diffie-Hellman public key. Then process 900 continues at 950.

At 950 the application back-end verifies that the first and second Diffie-Hellman shared secrets coincide. This concludes step 725 of process 700.

Figure 10:
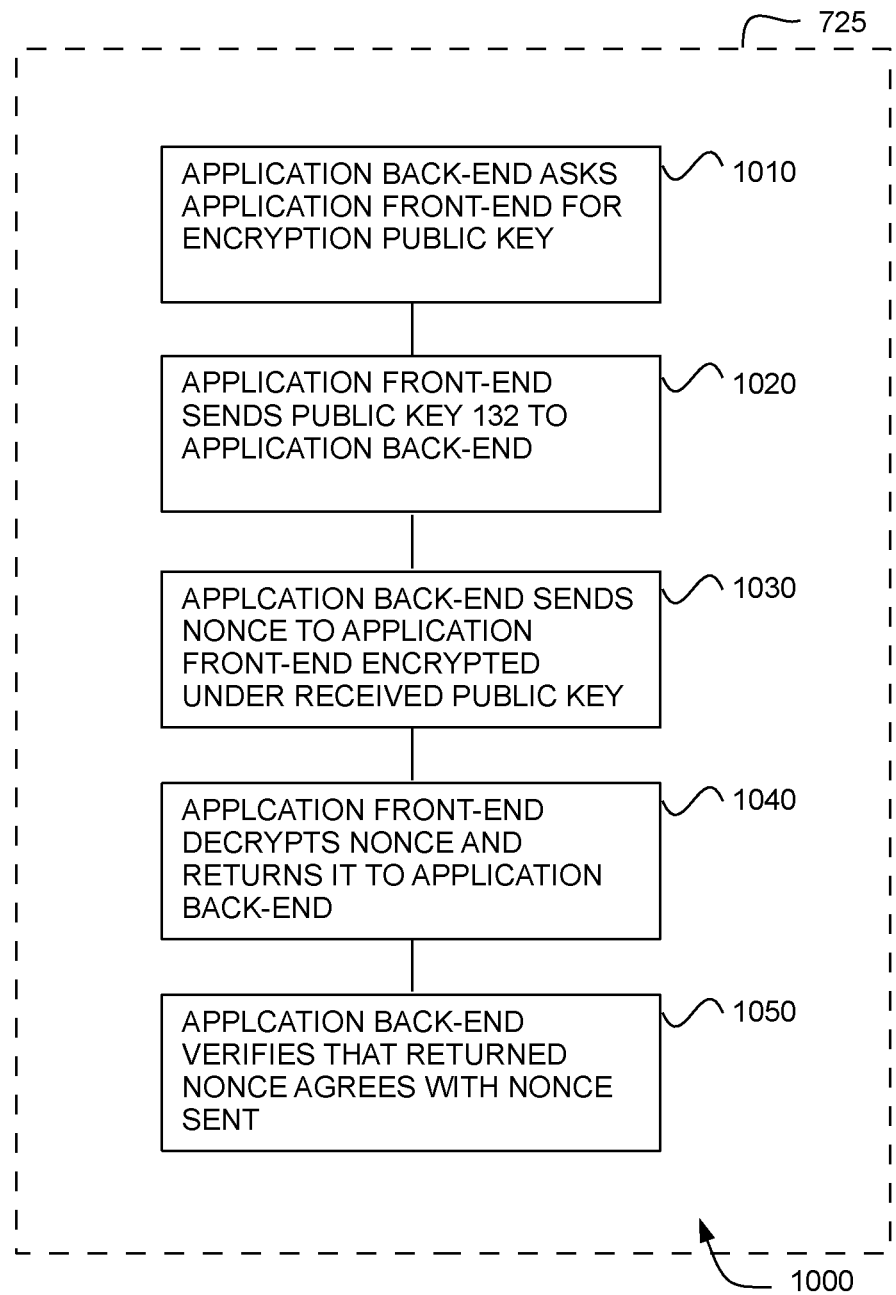
FIG. 10 is a flow diagram illustrating a process for proving knowledge of a private key pertaining to an asymmetric encryption cryptosystem.

FIG. 10 is a flow diagram illustrating a process 1000 used to implement step 725 of process 700 in some embodiments in which the key pair 130 pertains to an asymmetric encryption cryptosystem.

At 1010 the application back-end sends a message to the application front-end over the secure connection established at step 710 of process 700, asking the application front-end to initiate authentication by sending an encryption public key. Then process 1000 continues at 1020.

At 1020 the application front-end sends the public key 132 to the application back-end over the secure connection. Then process 1000 continues at 1030.

At 1030 the application back-end encrypts a nonce under the public key received at step 1030 and sends it to the application front-end over the secure connection. Then process 1000 continues at 1040.

At 1040 the application front-end decrypts the encrypted nonce received at step 1040 using the private key 131, and sends the decrypted nonce to the application back-end over the secure connection. Then process 1000 continues at 1050.

At 1050 the application back-end verifies that the decrypted nonce received at step 1040 coincides with the nonce sent at step 1030. This concludes step 725 of process 700.

Figure 11:
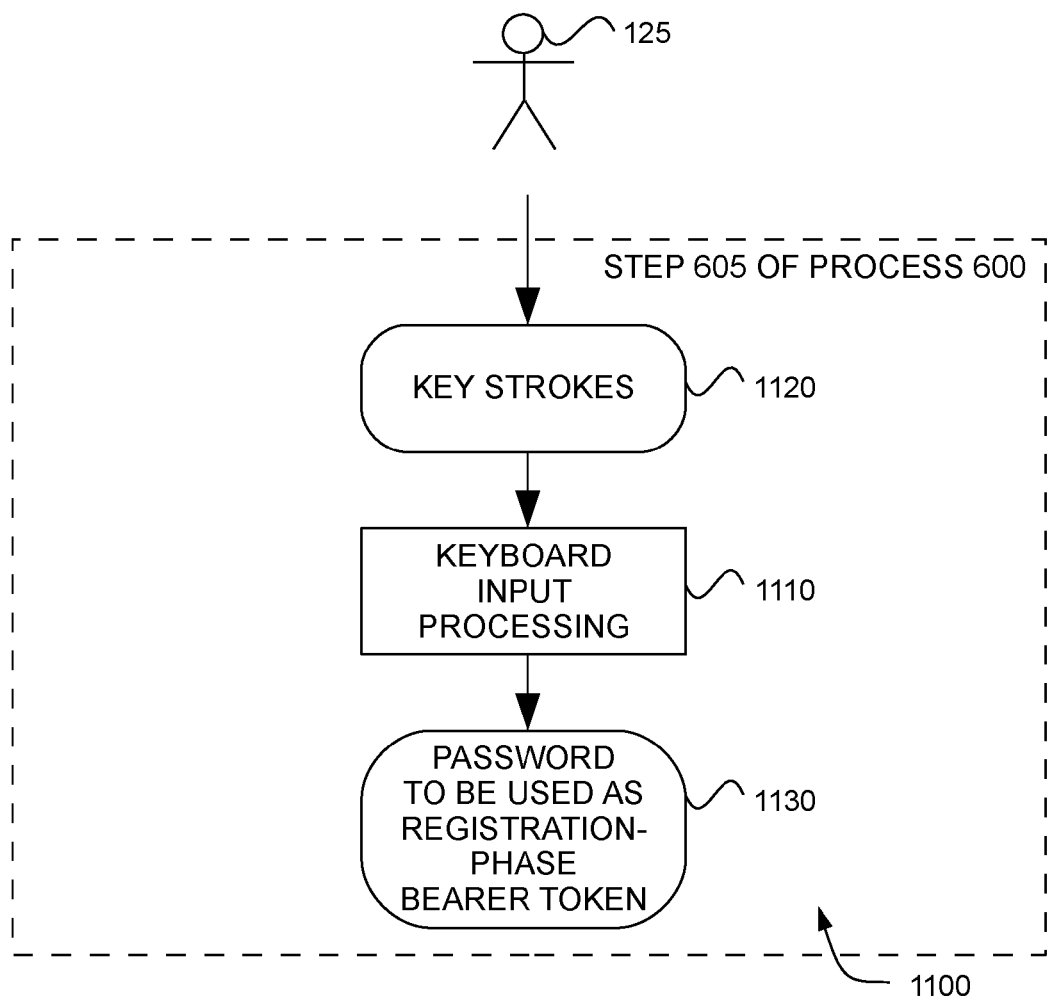
FIG. 11 is a data flow diagram illustrating a process for obtaining a registration-phase bearer token consisting of a password.

FIG. 11 is a dataflow diagram illustrating a process 1100 used by the application front-end 106 to obtain a registration-phase bearer token consisting of a password at step 605 of process 600, according to some embodiments. In FIG. 11 and subsequent dataflow diagrams, a box with rounded corners represents data whereas a rectangular box represents a processing step, such as a substep of step 650 or 730. Steps in a data flow diagram can be performed in any order consistent with the flow of data, i.e., each step can be performed at any time once its inputs have become available as the outputs of other steps.

At 1110, the application front-end processes key strokes 1120 entered by user 125 on a keyboard or a touch screen, producing a registration-phase password 1130 to be used as a registration-phase bearer token, encoded in a character set such as Uniform Transformation Format 8-bit (UTF-8) or American Standard Code for Information Interchange (ASCII).

Figure 12:
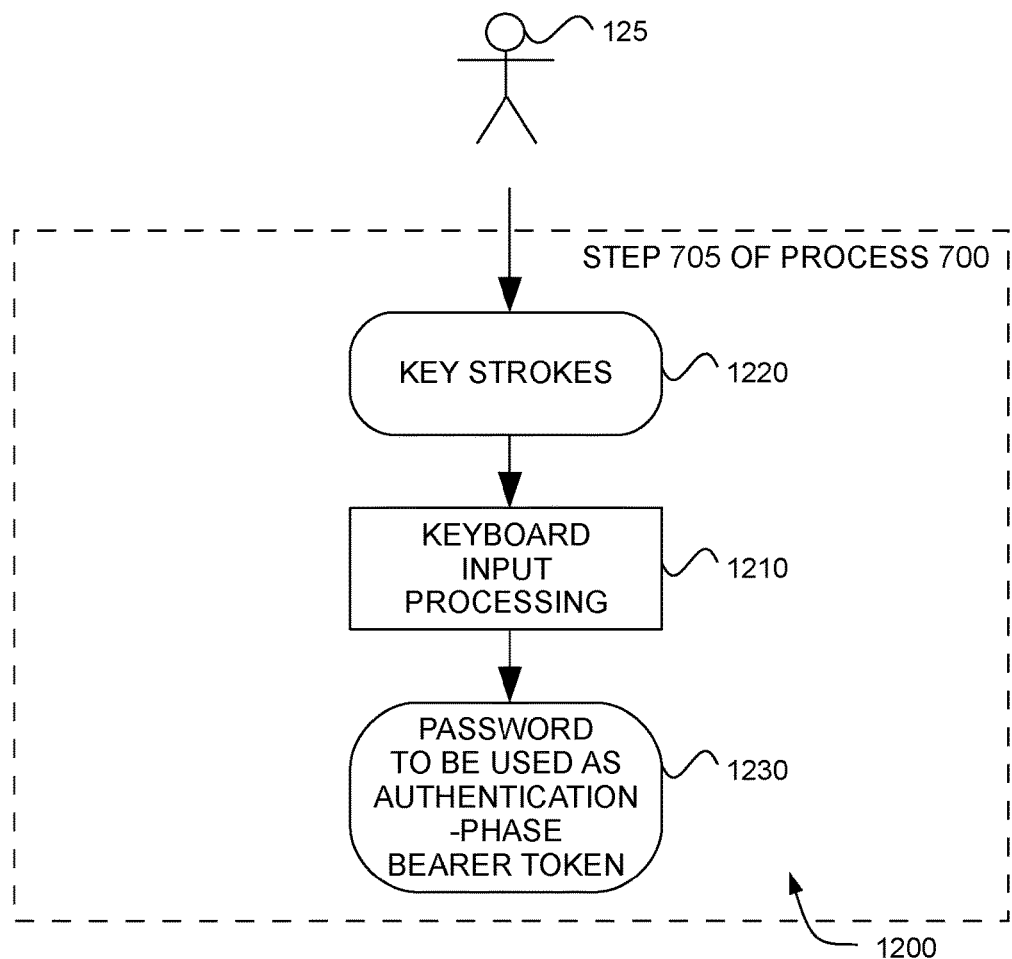
FIG. 12 is a dataflow diagram illustrating a process for obtaining an authentication-phase bearer token consisting of a password.

FIG. 12 is a dataflow diagram illustrating a process 1200 used by the application front-end 106 to obtain an authentication-phase bearer token consisting of a password at step 705 of process 700, according to the same embodiments illustrated in FIG. 11.

At 1210, the application front-end processes key strokes 1220 entered by user 125 on a keyboard or a touch screen, producing an authentication-phase password 1230 to be used as an authentication-phase bearer token, encoded in a character set such as Uniform Transformation Format 8-bit (UTF-8) or American Standard Code for Information Interchange (ASCII).

Figure 13:
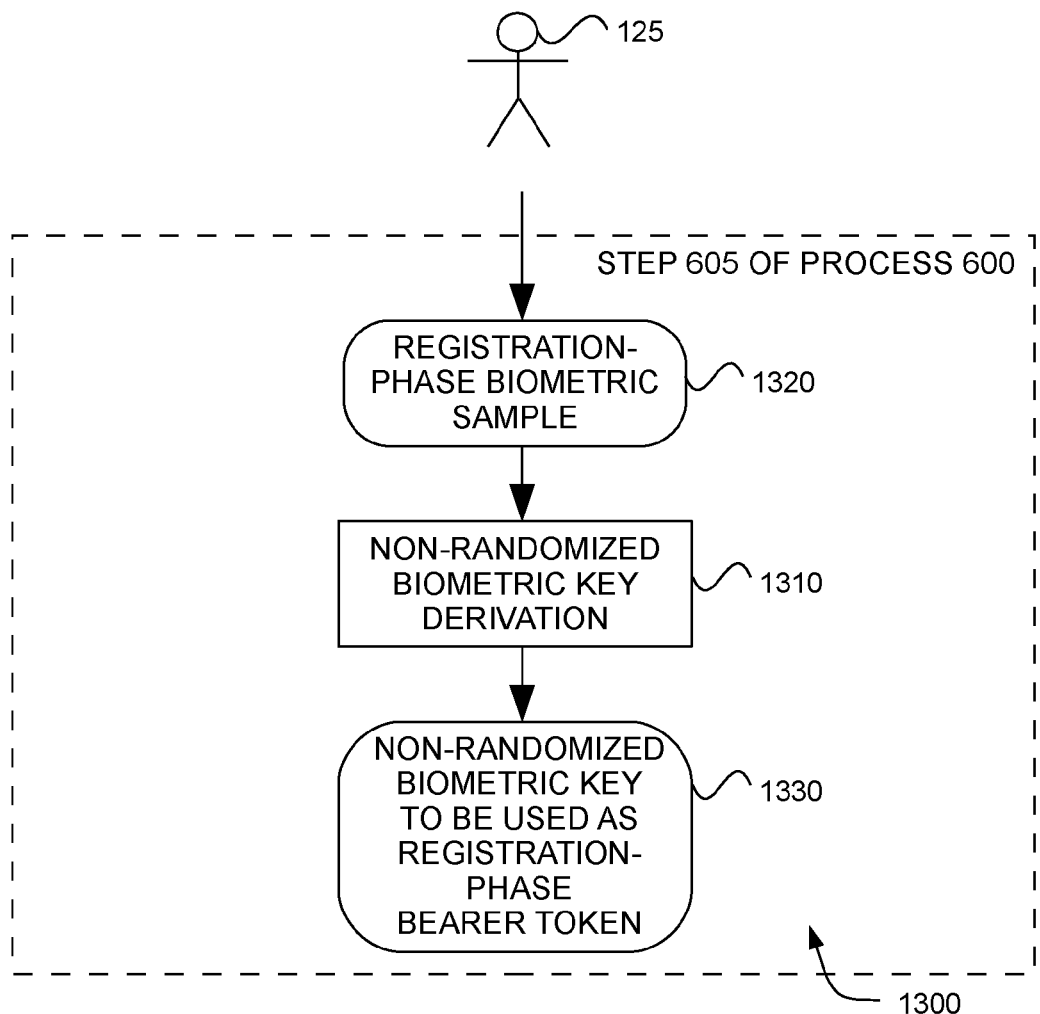
FIG. 13 is a dataflow diagram illustrating a process for obtaining a registration-phase bearer token consisting of a non-randomized biometric key.

FIG. 13 is a dataflow diagram illustrating a process 1300 used by the application front-end 106 to obtain a registration-phase bearer token consisting of a non-randomized biometric key at step 605 of process 600, according to some embodiments.

At 1310 the application front-end processes a registration-phase biometric sample 1320 supplied by user 125, deriving a registration-phase non-randomized biometric key 1330 to be used as a registration-phase bearer token. In some embodiments, a registration-phase biometric code is used as an intermediate result in the derivation of the biometric key.

Figure 14:
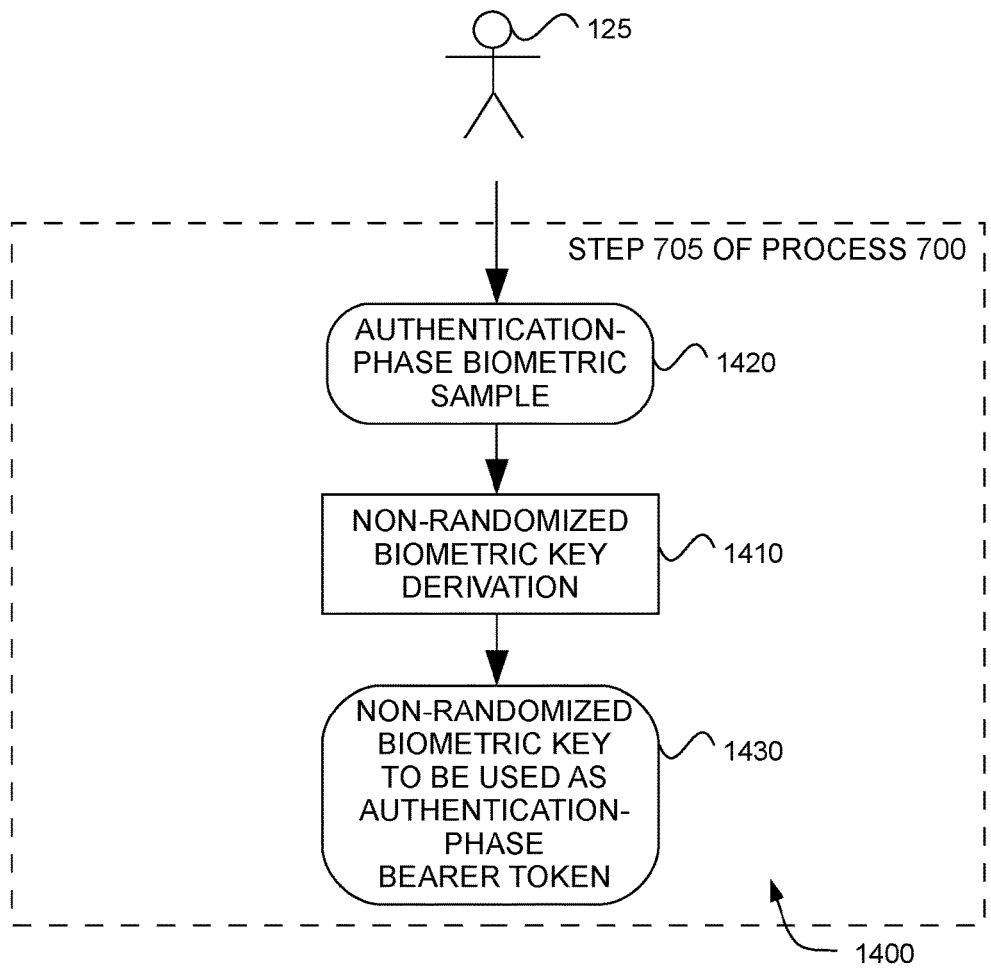
FIG. 14 is a dataflow diagram illustrating a process for obtaining an authentication-phase bearer token consisting of a non-randomized biometric key.

FIG. 14 is a dataflow diagram illustrating a process 1400 used by the application front-end 106 to obtain an authentication-phase bearer token consisting of a non-randomized biometric key at step 705 of process 700, according to the same embodiments illustrated in FIG. 13.

At 1410 the application front-end processes an authentication-phase biometric sample 1420 supplied by user 125, deriving an authentication-phase non-randomized biometric key 1430 to be used as an authentication-phase bearer token. In some embodiments, an authentication-phase biometric code is used as an intermediate result in the derivation of the authentication-phase non-randomized biometric key.

Figure 15:
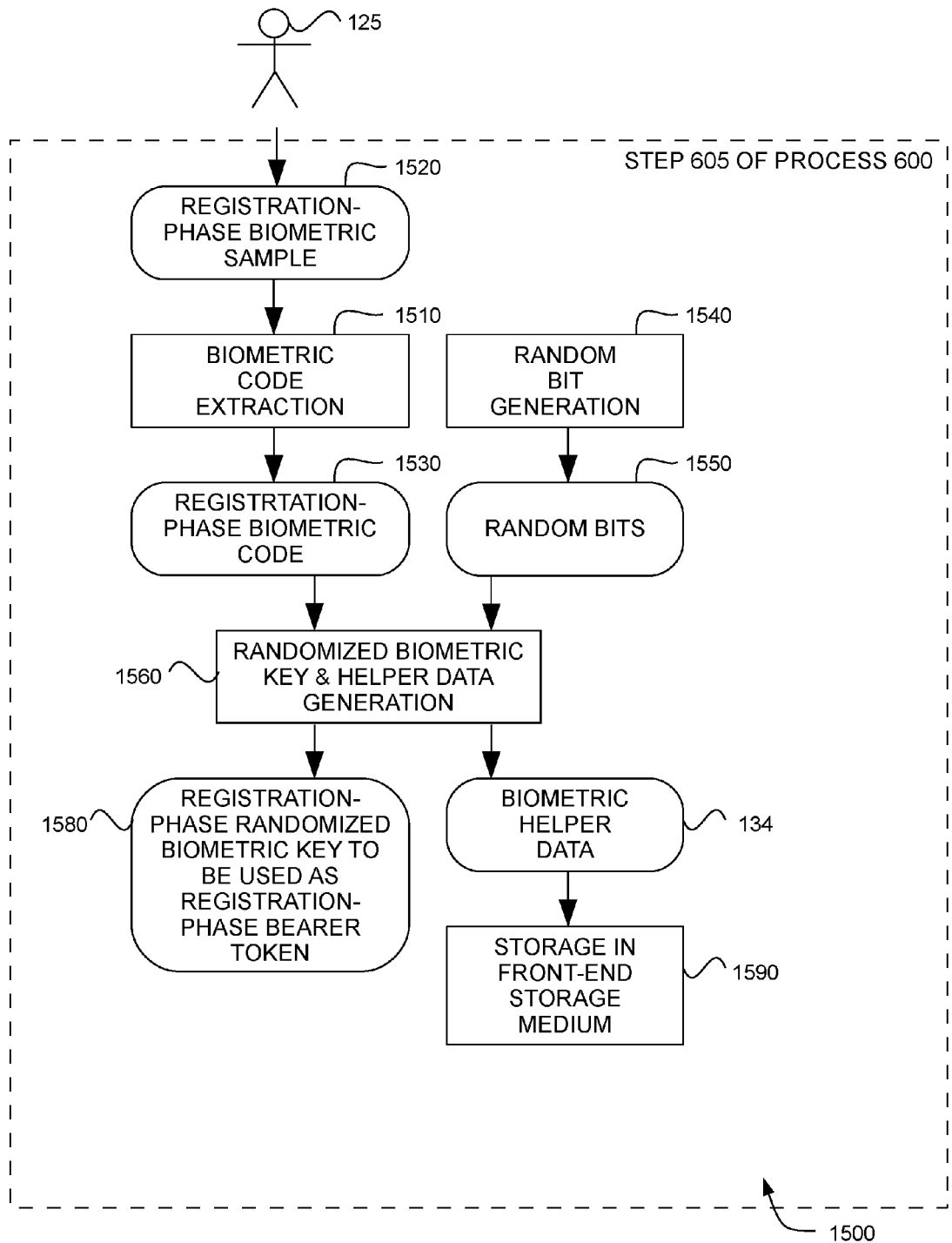
FIG. 15 is a dataflow diagram illustrating a process for obtaining a registration-phase bearer token consisting of a randomized biometric key.

FIG. 15 is a dataflow diagram illustrating a process 1500 used by the application front-end 106 at step 605 of process 600 to obtain a registration-phase bearer token consisting of a randomized biometric key, and to compute and store biometric helper data, according to some embodiments.

At 1510 the application front-end processes a registration-phase biometric sample 1520 supplied by the user 125, extracting a registration-phase biometric code 1530.

At 1540 the application front-end generates random bits 1550 using a random bit generator implemented as described in NIST Special Publications SP 800-90 A, B and C.

At 1560 the application front-end generates biometric helper data 134 and a registration-phase randomized biometric key 1580 to be used as a registration-phase bearer token, from the registration-phase biometric code and the random bits.

At 1590 the application front-end stores the biometric helper data 134 in the front-end storage medium 139.

Figure 16:
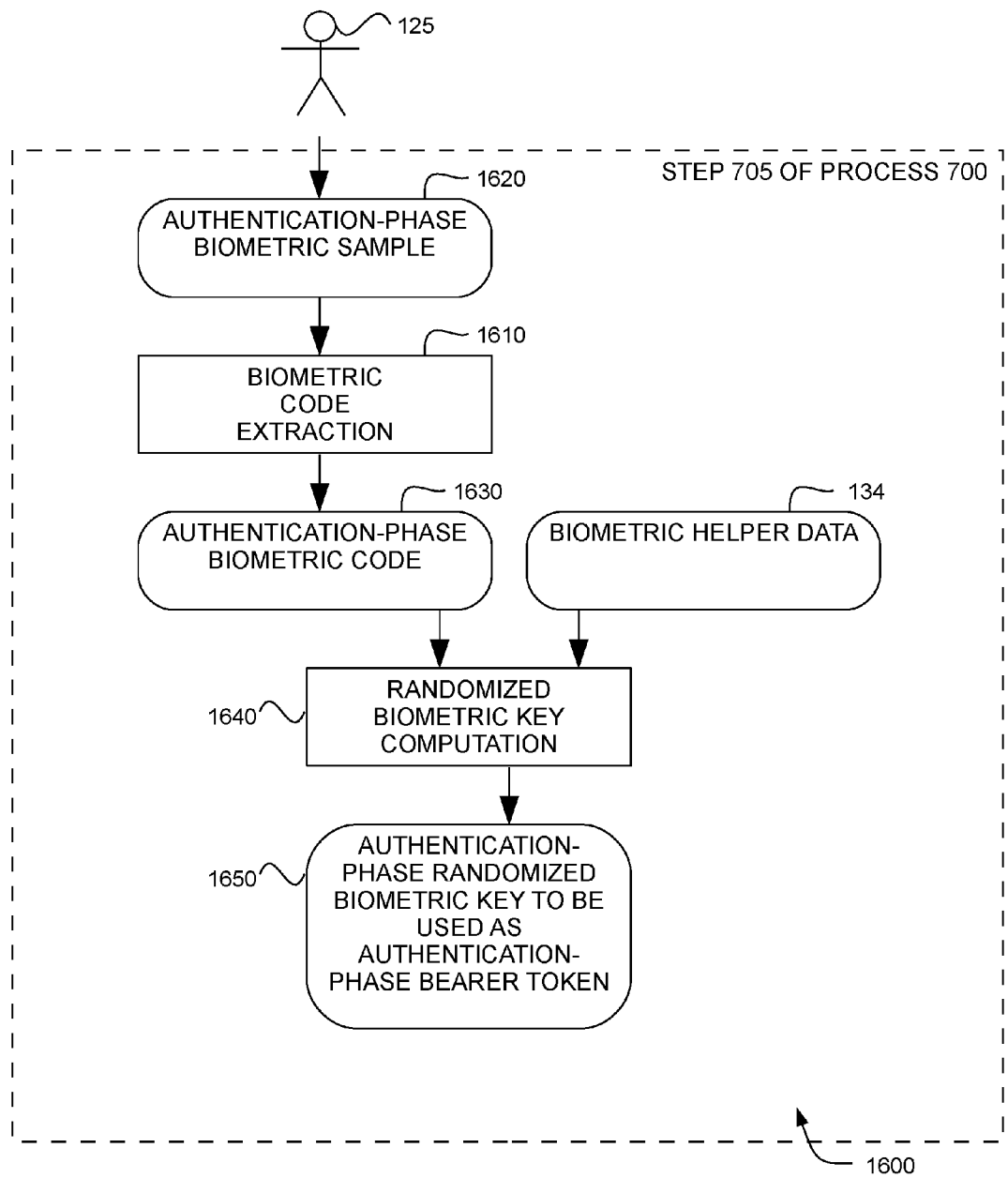
FIG. 16 is a dataflow diagram illustrating a process for obtaining an authentication-phase bearer token consisting of a randomized biometric key.

FIG. 16 is a dataflow diagram illustrating a process 1600 used by the application front-end 106 at step 705 of process 700 to obtain an authentication-phase bearer token consisting of a randomized biometric key, according to the same embodiments illustrated in FIG. 15.

At 1610 the application front-end processes an authentication-phase biometric sample 1620 supplied by the user 125, extracting an authentication-phase biometric code 1630.

At 1640 the application front-end computes an authentication-phase randomized biometric key 1650, to be used as an authentication-phase bearer token, from the authentication-phase biometric code 1630 and the biometric helper data 134 found in front-end storage medium 139.

Figure 17:
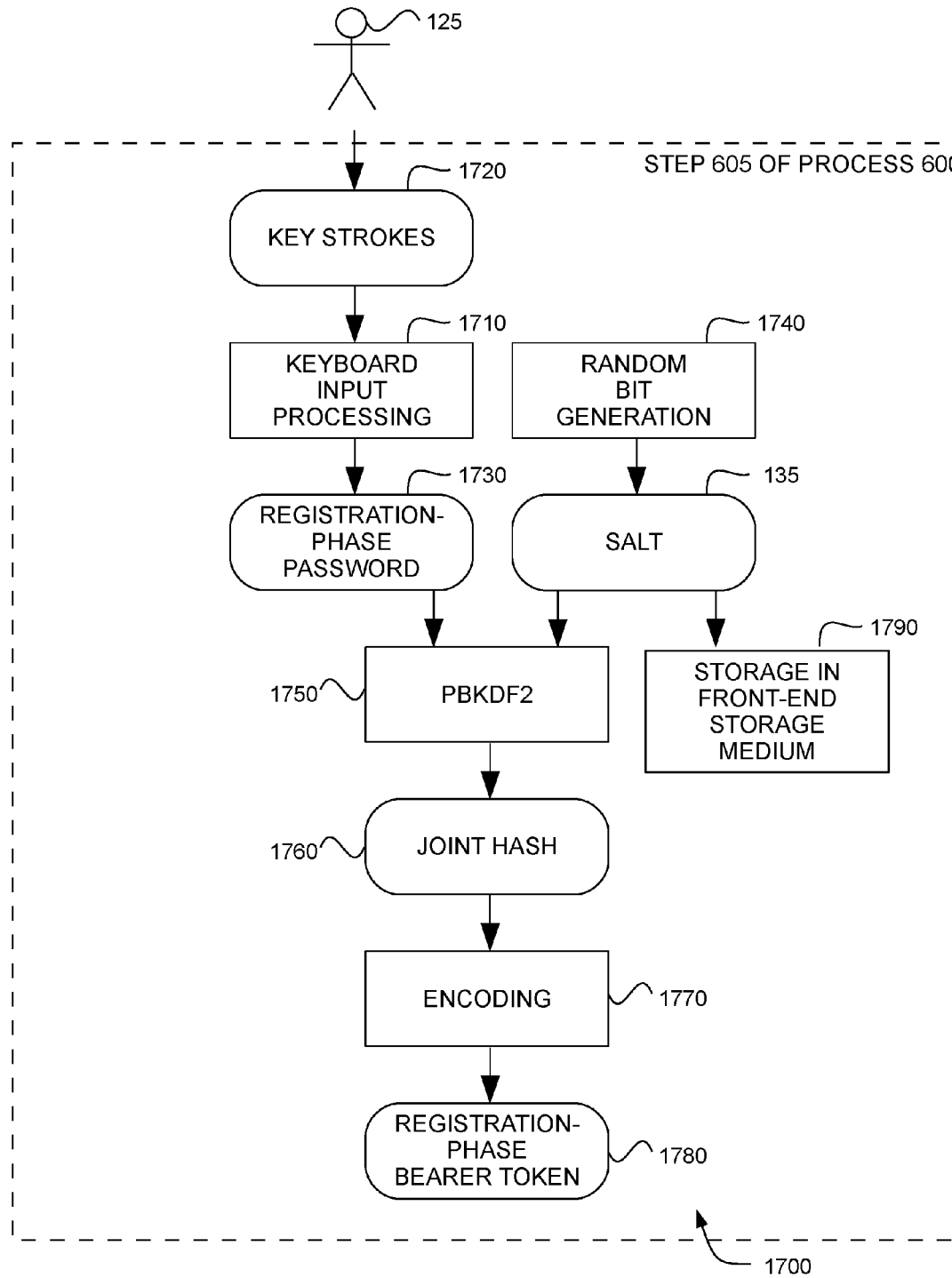
FIG. 17 is a dataflow diagram illustrating a process for obtaining a registration-phase bearer token consisting of a joint hash of a password and a salt.

FIG. 17 is a dataflow diagram illustrating a process 1700 used by the application front-end 106 at step 605 of process 600 to obtain a registration-phase bearer token consisting of a joint hash of a password and a salt, and to compute and store the salt, according to some embodiments.

At 1710 the application front-end processes key strokes 1720 entered by the user 125 on a keyboard or a touch screen, producing a registration-phase password 1730 encoded in a character set such as UTF-8 or ASCII.

At 1740 the application front-end uses a random bit generator implemented as described in NIST Special Publications SP 800-90 A, B and C to generate a salt 135.

At 1750 the application front-end applies the function PBKDF2 to the registration-phase password 1730 and the salt 135 to produce a joint hash 1760. In some embodiments PBKDF2 is used with the following arguments besides the password argument and the salt argument: HMAC-SHA256 as the pseudorandom function argument, the number 4096 as the iteration count argument, and the number 32 as the derived key length argument.

At 1770 the application front-end derives a registration-phase bearer token 1780 from the joint hash, e.g. by applying an encoding such as a hexadecimal encoding, a base-64 encoding or a base-58 encoding. In some embodiments step 1770 is omitted, the registration-phase bearer token being the joint hash 1760.

At 1790, the application front-end stores the salt 135 in the front-end storage medium 139.

Figure 18:
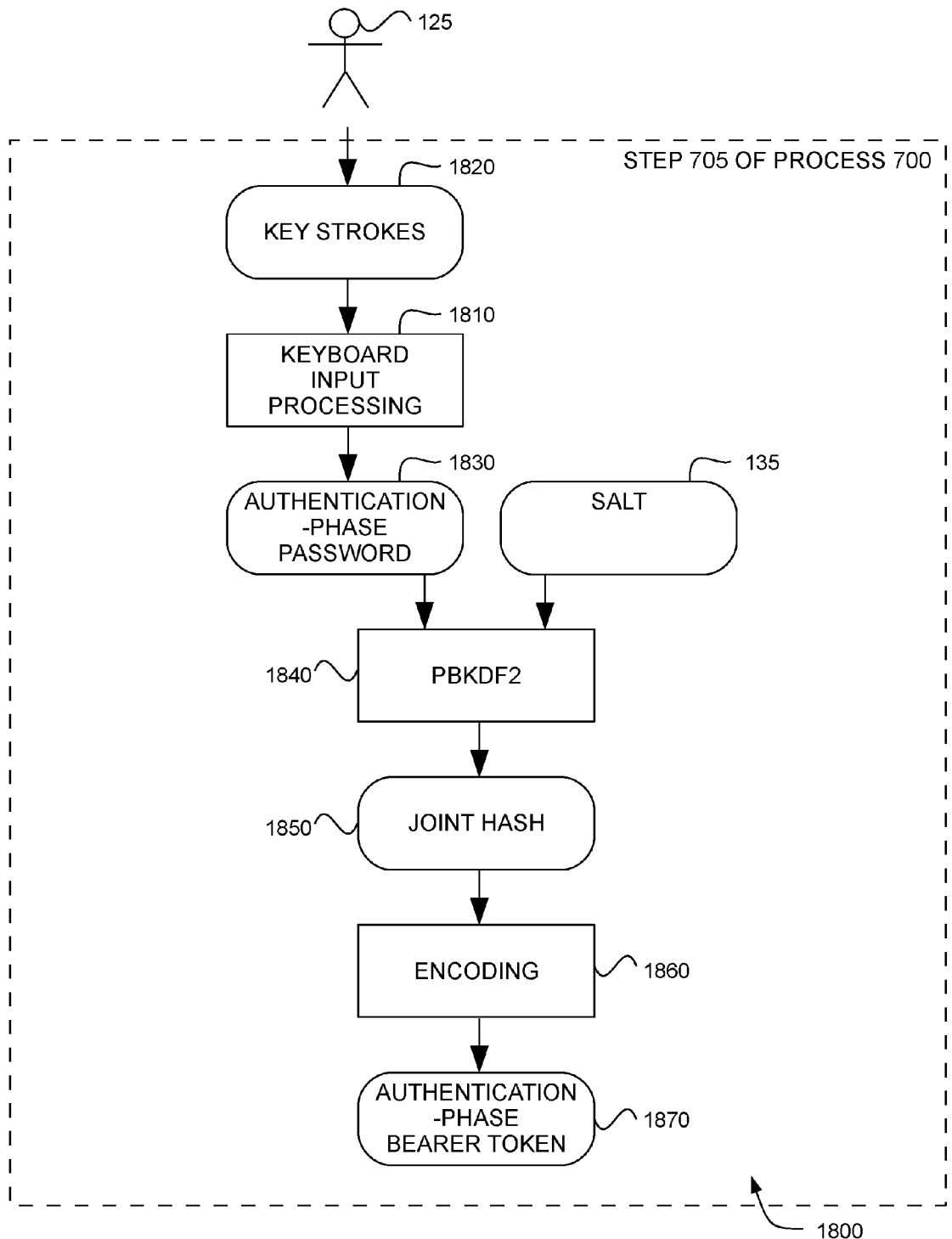
FIG. 18 is a dataflow diagram illustrating a process for obtaining an authentication-phase bearer token consisting of a joint hash of a password and a salt.

FIG. 18 is a dataflow diagram illustrating a process 1800 used by the application front-end 106 at step 705 of process 700 to obtain an authentication-phase bearer token consisting of a joint hash of a password and a salt, according to the same embodiments illustrated in FIG. 17. By using as an authentication-phase bearer token a joint hash of the password and the salt instead of sending a password in the clear, such embodiments protect the password against an adversary who breaches the security of the back-end subsystem and might be able to capture the cleartext password if, for example, the secure connection established at step 710 of process 700 is terminated at a reverse proxy within the back-end subsystem 195.

At 1810 the application front-end processes key strokes 1820 entered by the user 125 on a keyboard or a touch screen, producing an authentication-phase password 1830 encoded in a character set such as UTF-8 or ASCII.

At 1840 the application front-end applies the function PBKDF2 to the authentication-phase password 1830 and the salt 135 found in the front-end storage medium 139, producing a joint hash 1850. PBKDF2 is used with the same arguments as in step 1760 of process 1700, except that the password argument is the authentication-phase password 1830 instead of the registration-phase password 1730.

At 1860 the application front-end derives an authentication-phase bearer token 1870 from the joint hash, e.g. by applying an encoding such as a hexadecimal encoding, a base-64 encoding or a base-58 encoding. In some embodiments in which step 1770 of process 1700 is omitted, step 1860 is also omitted, the authentication-phase bearer token being the joint hash 1860.

Figure 19:
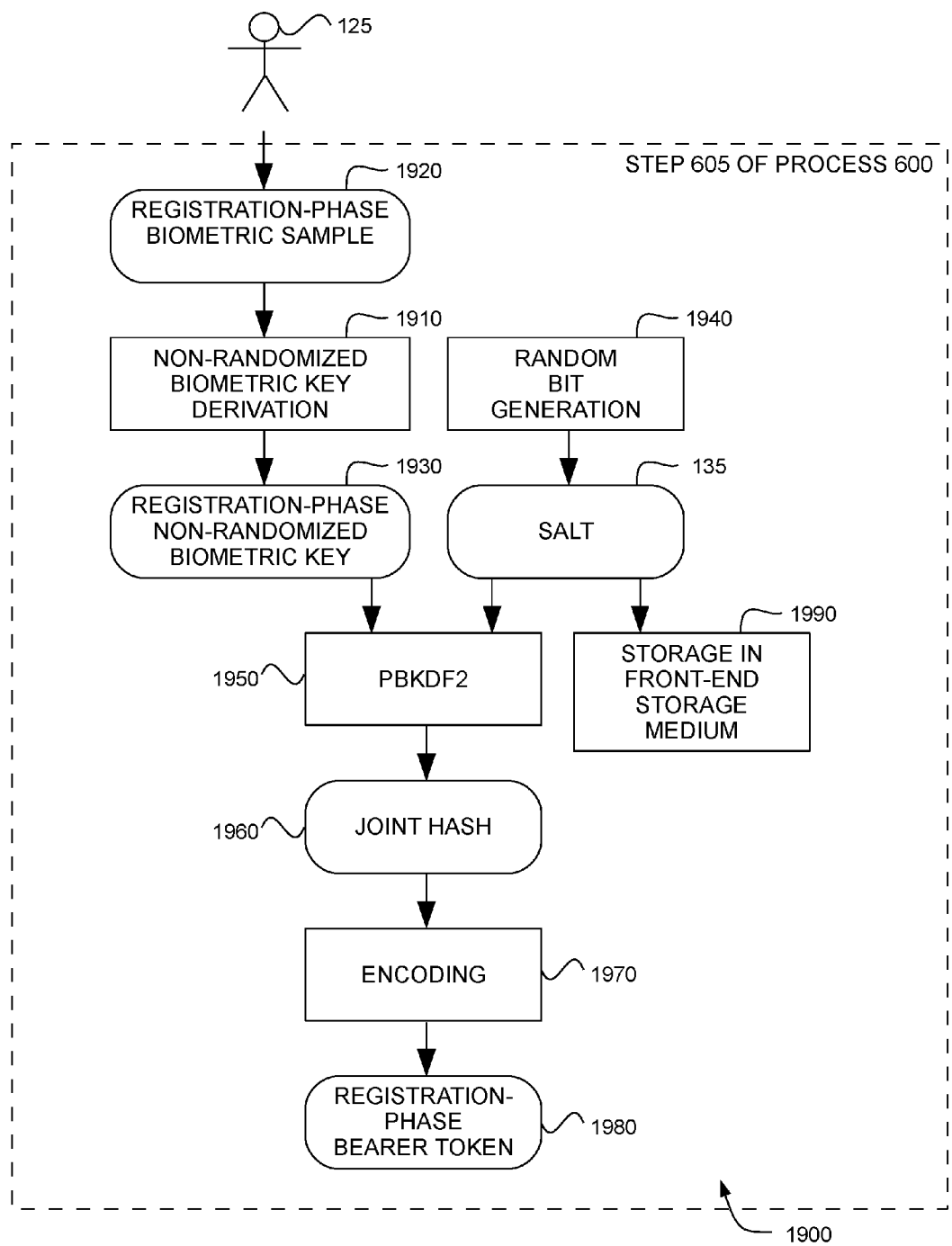
FIG. 19 is a dataflow diagram illustrating a process for obtaining a registration-phase bearer token consisting of a joint hash of a non-randomized biometric key and a salt.

FIG. 19 is a dataflow diagram of a process 1900 used by the application front-end 106 at step 605 of process 600 to obtain a registration-phase bearer token consisting of a joint hash of a non-randomized biometric key and a salt, and to compute and store the salt, according to some embodiments.

At 1910 the application front-end processes a registration-phase biometric sample 1920 supplied by user 125, deriving a registration-phase non-randomized biometric key 1930. In some embodiments, a registration-phase biometric code is used as an intermediate result in the derivation of the biometric key.

At 1940 the application front-end uses a random bit generator implemented as described in NIST Special Publications SP 800-90 A, B and C to generate a salt 135.

At 1950 the application front-end applies the function PBKDF2 to the registration-phase non-randomized biometric key 1930 and the salt 135 to produce a joint hash 1960, the non-randomized biometric key being used as the password argument of PBKDF2. In some embodiments PBKDF2 is used with the following arguments besides the password argument and the salt argument: HMAC-SHA256 as the pseudorandom function argument, the number 4096 as the iteration count argument, and the number 32 as the derived key length argument.

At 1970 the application front-end derives a registration-phase bearer token 1980 from the joint hash, e.g. by applying an encoding such as a hexadecimal encoding, a base-64 encoding or a base-58 encoding. In some embodiments step 1970 is omitted, the registration-phase bearer token being the joint hash 1960.

At 1990, the application front-end stores the salt 135 in the front-end storage medium 139.

Figure 20:
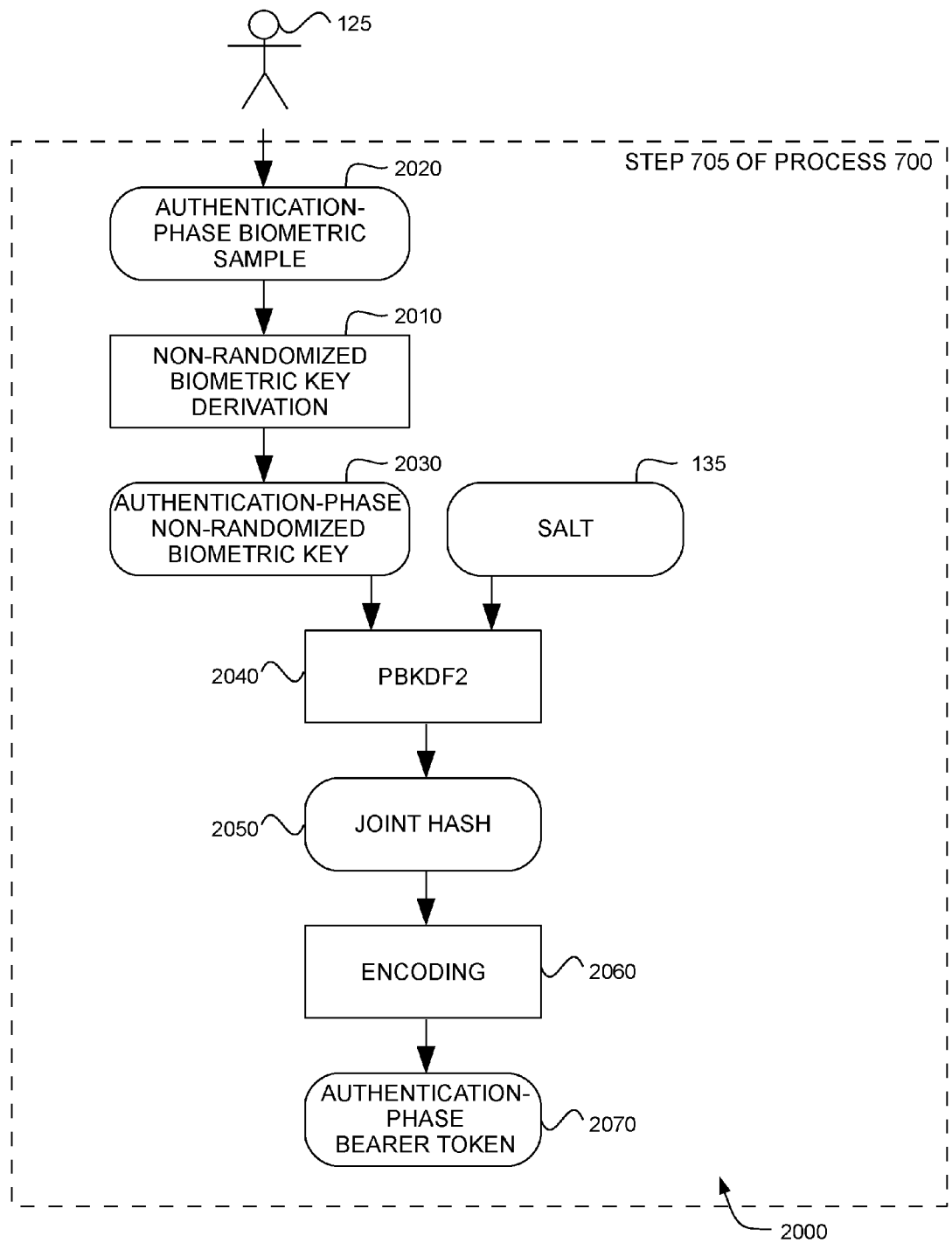
FIG. 20 is a dataflow diagram illustrating a process for obtaining an authentication-phase bearer token consisting of a joint hash of a non-randomized biometric key and a salt.

FIG. 20 is a dataflow diagram of a process 2000 used by the application front-end 106 at step 705 of process 700 to obtain an authentication-phase bearer token consisting of a joint hash of a non-randomized biometric key and a salt, according to the same embodiments illustrated in FIG. 19. By using as an authentication-phase bearer token a joint hash of the non-randomized biometric key and the salt instead of sending the non-randomized biometric key in the clear, such embodiments protect the non-randomized biometric key against an adversary who breaches the security of the back-end subsystem and might be able to capture the cleartext non-randomized biometric key if, for example, the secure connection established at step 710 of process 700 is terminated at a reverse proxy within the back-end subsystem 195.

At 2010 the application front-end processes an authentication-phase biometric sample 2020 supplied by user 125, deriving an authentication-phase non-randomized biometric key 2030. In some embodiments, an authentication-phase biometric code is used as an intermediate result in the derivation of the biometric key.

At 2040 the application front-end applies the function PBKDF2 to the authentication-phase non-randomized biometric key 2030 and the salt 135 found in the front-end storage medium 139, producing a joint hash 2050. PBKDF2 is used with the same arguments as in step 1960 of process 1900, except that the password argument is the authentication-phase non-randomized biometric key 2030 instead of the registration-phase non-randomized biometric key 1930.

At 2060 the application front-end derives an authentication-phase bearer token 2070 from the joint hash, e.g. by applying an encoding such as a hexadecimal encoding, a base-64 encoding or a base-58 encoding. In some embodiments in which step 1970 of process 1900 is omitted, step 2060 is also omitted, the authentication-phase bearer token being the joint hash 2060.

Figure 21:
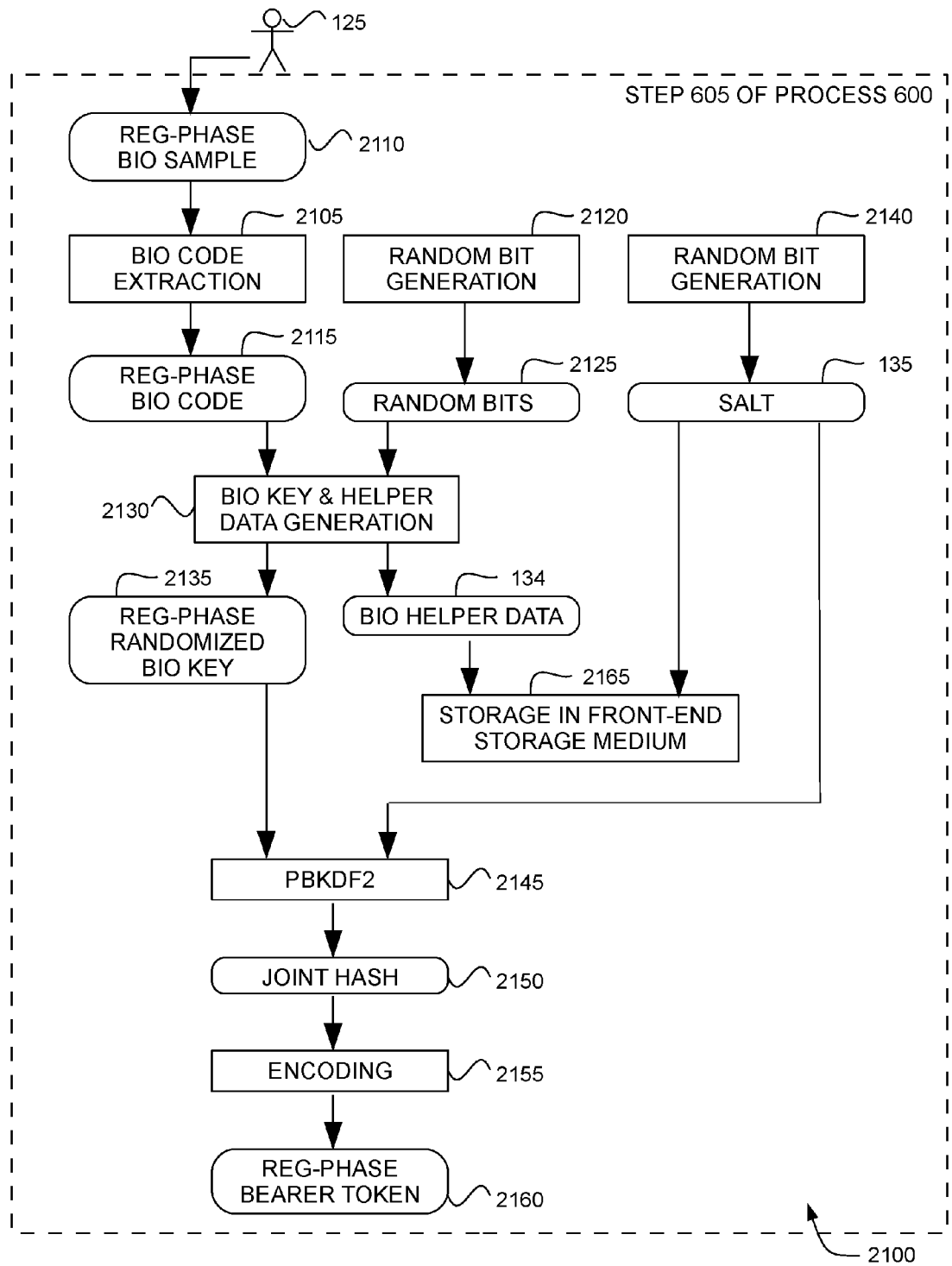
FIG. 21 is a dataflow diagram illustrating a process for obtaining a registration-phase bearer token consisting of a joint hash of a randomized biometric key and a salt.

FIG. 21 is a data flow diagram of a process 2100 used by the application front-end 106 at step 605 of process 600 to obtain a registration-phase bearer token consisting of a joint hash of a randomized biometric key and a salt, and to compute and store the salt and biometric helper data, according to some embodiments.

The following abbreviations are used in the figure: "bio" for "biometric", "reg-phase" for "registration-phase".

At 2105 the application front-end processes a registration-phase biometric sample 2110 supplied by the user 125, extracting a registration-phase biometric code 2115.

At 2120 the application front-end generates random bits 2125 using a random bit generator implemented as described in NIST Special Publications SP 800-90 A, B and C.

At 2130 the application front-end generates biometric helper data 134 and a registration-phase randomized biometric key 2135 from the registration-phase biometric code and the random bits.

At 2140 the application front-end generates a salt 135 using the same random bit generator used at 2120.

At 2145 the application front-end applies the function PBKDF2 to the registration-phase randomized biometric key 2130 and the salt 135 to produce a joint hash 2150, the non-randomized biometric key being used as the password argument of PBKDF2. In some embodiments PBKDF2 is used with the following arguments besides the password argument and the salt argument: HMAC-SHA256 as the pseudorandom function argument, the number 4096 as the iteration count argument, and the number 32 as the derived key length argument.

At 2155 the application front-end derives a registration-phase bearer token 2160 from the joint hash, e.g. by applying an encoding such as a hexadecimal encoding, a base-64 encoding or a base-58 encoding. In some embodiments step 2155 is omitted, the registration-phase bearer token being the joint hash 2150.

At 2165, the application front-end stores the biometric helper data 134 and the salt 135 in the front-end storage medium 139.

Figure 22:
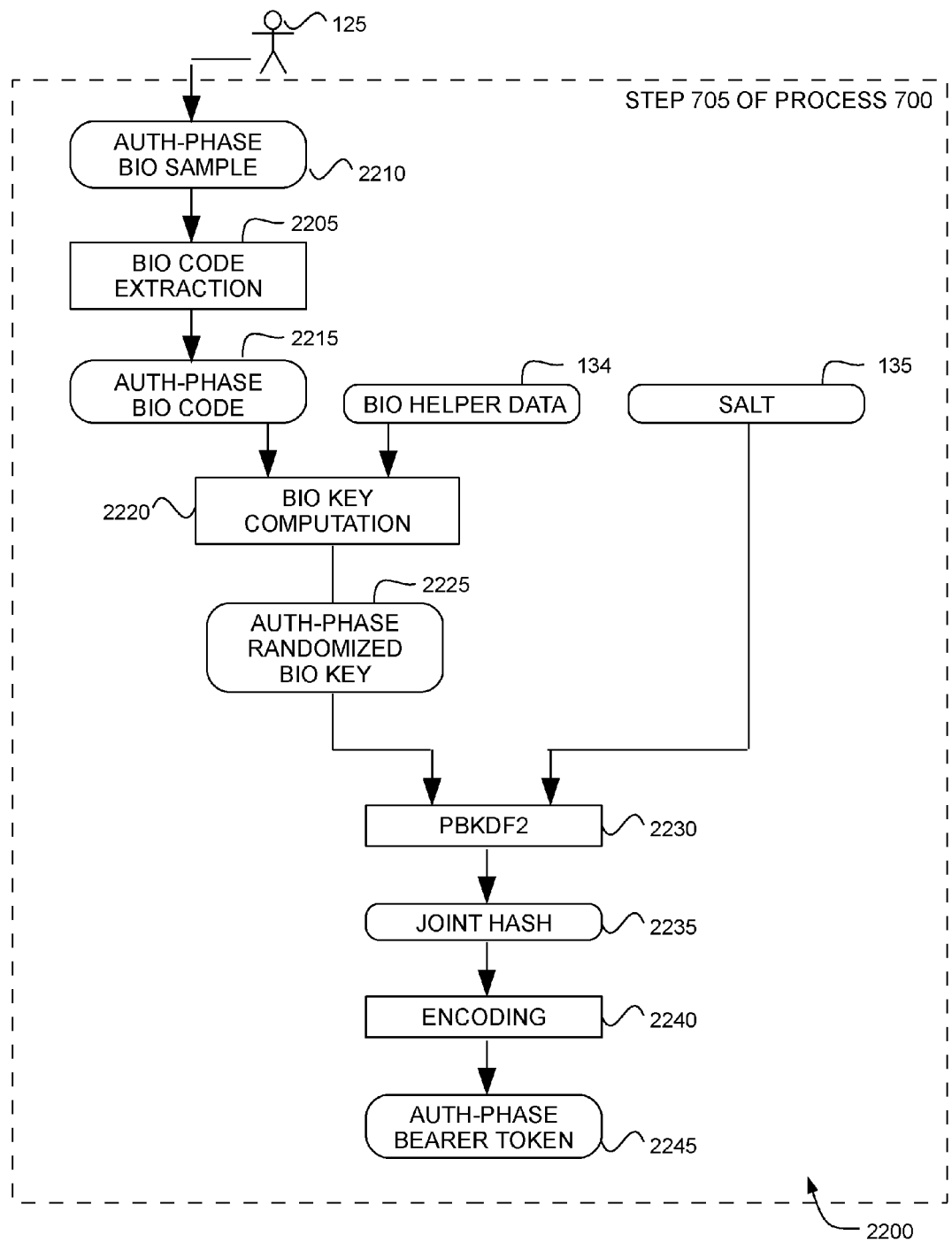
FIG. 22 is a dataflow diagram illustrating a process for obtaining an authentication-phase bearer token consisting of a joint hash of a randomized biometric key and a salt.

FIG. 22 is a dataflow diagram of a process 2200 used by the application front-end 106 at step 705 of process 700 to obtain an authentication-phase bearer token consisting of a joint hash of a randomized biometric key and a salt, according to the same embodiments illustrated in FIG. 21. By using as an authentication-phase bearer token a joint hash of the randomized biometric key and the salt instead of sending the randomized biometric key in the clear, such embodiments protect the randomized biometric key against an adversary who breaches the security of the back-end subsystem and might be able to capture the cleartext randomized biometric key if, for example, the secure connection established at step 710 of process 700 is terminated at a reverse proxy within the back-end subsystem 195. If the adversary also captures the biometric helper data 134, the adversary may be able to compute the biometric code 2215, which could have a severe impact on the user's privacy.

The following abbreviations are used in the figure: "bio" for "biometric", "auth-phase" for "authentication-phase".

At 2205 the application front-end processes an authentication-phase biometric sample 2210 supplied by the user 125, extracting an authentication-phase biometric code 2215.

At 2220 the application front-end computes an authentication-phase randomized biometric key 2225 from the authentication-phase biometric code 2215 and the biometric helper data 134 found in front-end storage medium 139.

At 2230 the application front-end applies the function PBKDF2 to the authentication-phase randomized biometric key 2225 and the salt 135 found in the front-end storage medium 139, producing a joint hash 2235. PBKDF2 is used with the same arguments as in step 2145 of process 2100, except that the password argument is the authentication-phase randomized biometric key 2225 instead of the registration-phase randomized biometric key 2135.

At 2240 the application front-end derives an authentication-phase bearer token 2245 from the joint hash, e.g. by applying an encoding such as a hexadecimal encoding, a base-64 encoding or a base-58 encoding. In some embodiments in which step 2155 of process 2100 is omitted, step 2240 is also omitted, the authentication-phase bearer token being the joint hash 2235.

Figure 23:
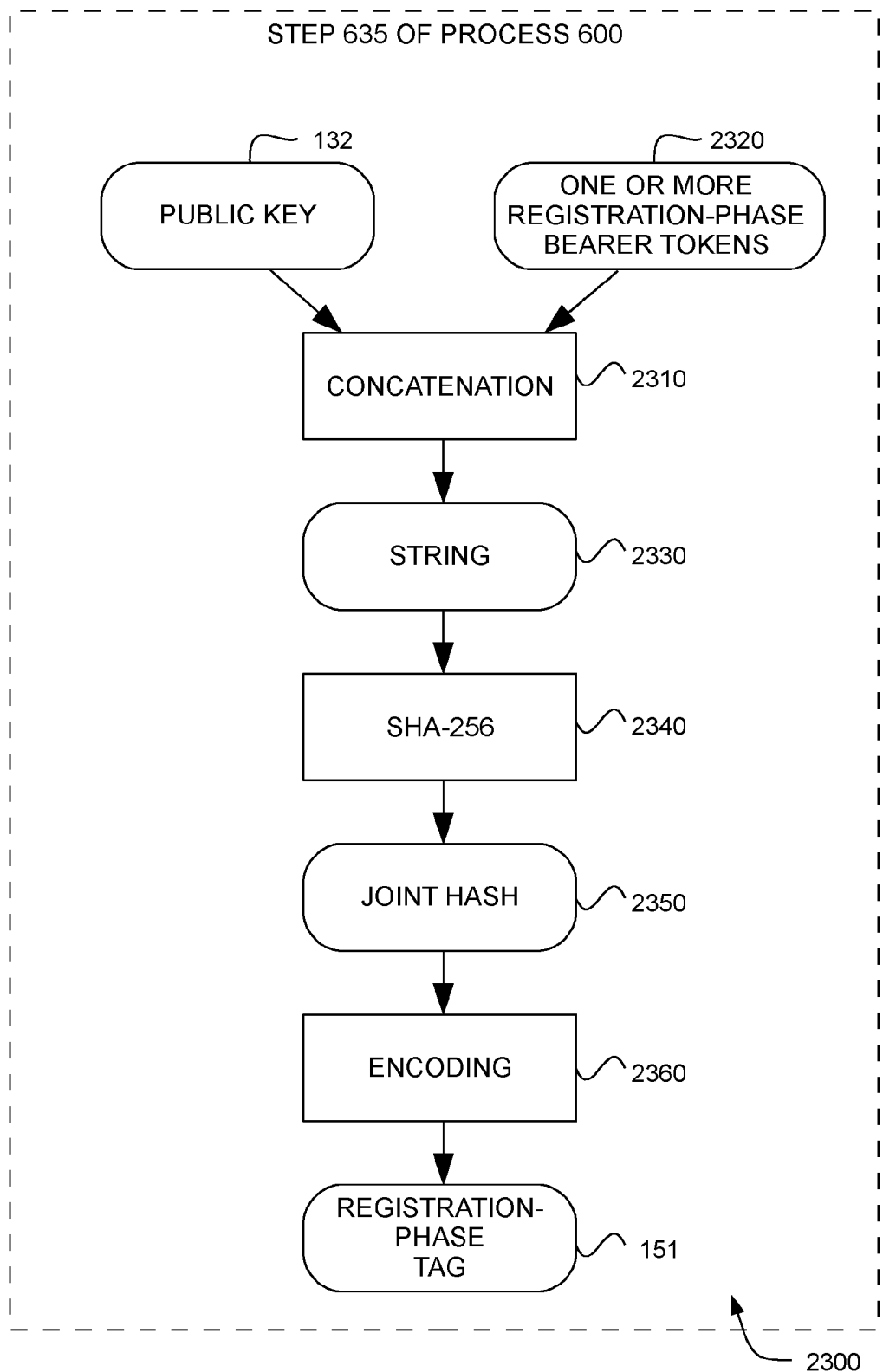
FIG. 23 is a dataflow diagram illustrating a process for computing a registration-phase tag derived from a joint hash of a public key and consistently reproducible bearer tokens.

FIG. 23 is a dataflow diagram illustrating a process 2300 for computing the registration-phase tag 151 at step 635 of process 600, according to some embodiments in which all the bearer tokens are consistently reproducible by the user. Examples of consistently reproducible bearer tokens include a password and a biometric key. A biometric code is an example of a bearer token that is not consistently reproducible by the user, because biometric codes extracted from genuine biometric samples are similar but not identical.

At 2310 the application back-end concatenates the public key 132 received at step 625 and the one or more registration-phase bearer tokens 2320 received at step 620, producing a string 2330.

At 2340 the application back-end applies the cryptographic hash function SHA-256 to the string 2330, producing a joint hash 2350.

At 2360 the application back-end derives the registration-phase tag 151 from the joint hash, e.g. by applying an encoding such as a hexadecimal encoding, a base-64 encoding or a base-58 encoding. In some embodiments step 2360 is omitted, the registration-phase tag 151 being equal to the joint hash 2350.

Figure 24:
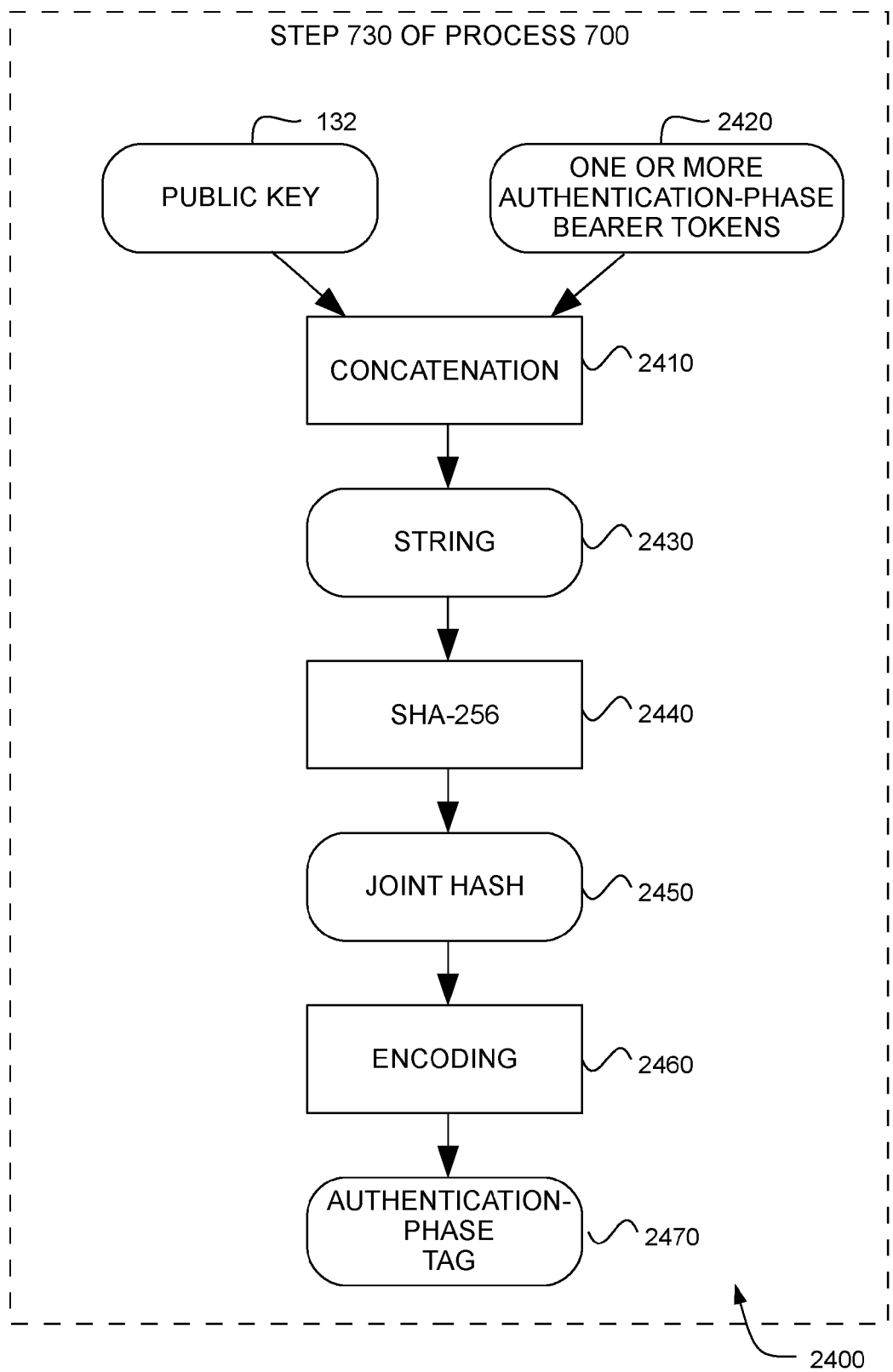
FIG. 24 is a dataflow diagram illustrating a process for computing an authentication-phase tag derived from a joint hash of a public key and consistently reproducible bearer tokens.

FIG. 24 is a dataflow diagram illustrating a process 2400 for computing an authentication-phase tag at step 730 of process 700, according to the same embodiments illustrated in FIG. 23.

At 2410 the application back-end concatenates the public key 132 received at step 725 and the one or more authentication-phase bearer tokens 2420 received at step 715, producing a string 2430.

At 2440 the application back-end applies the cryptographic hash function SHA-256 to the string 2430, producing a joint hash 2450.

At 2460 the application back-end derives an authentication-phase tag 2470 from the joint hash, e.g. by applying an encoding such as a hexadecimal encoding, a base-64 encoding or a base-58 encoding. In some embodiments step 2460 is omitted, the authentication-phase tag 2470 being equal to the joint hash 2450.

Figure 25:
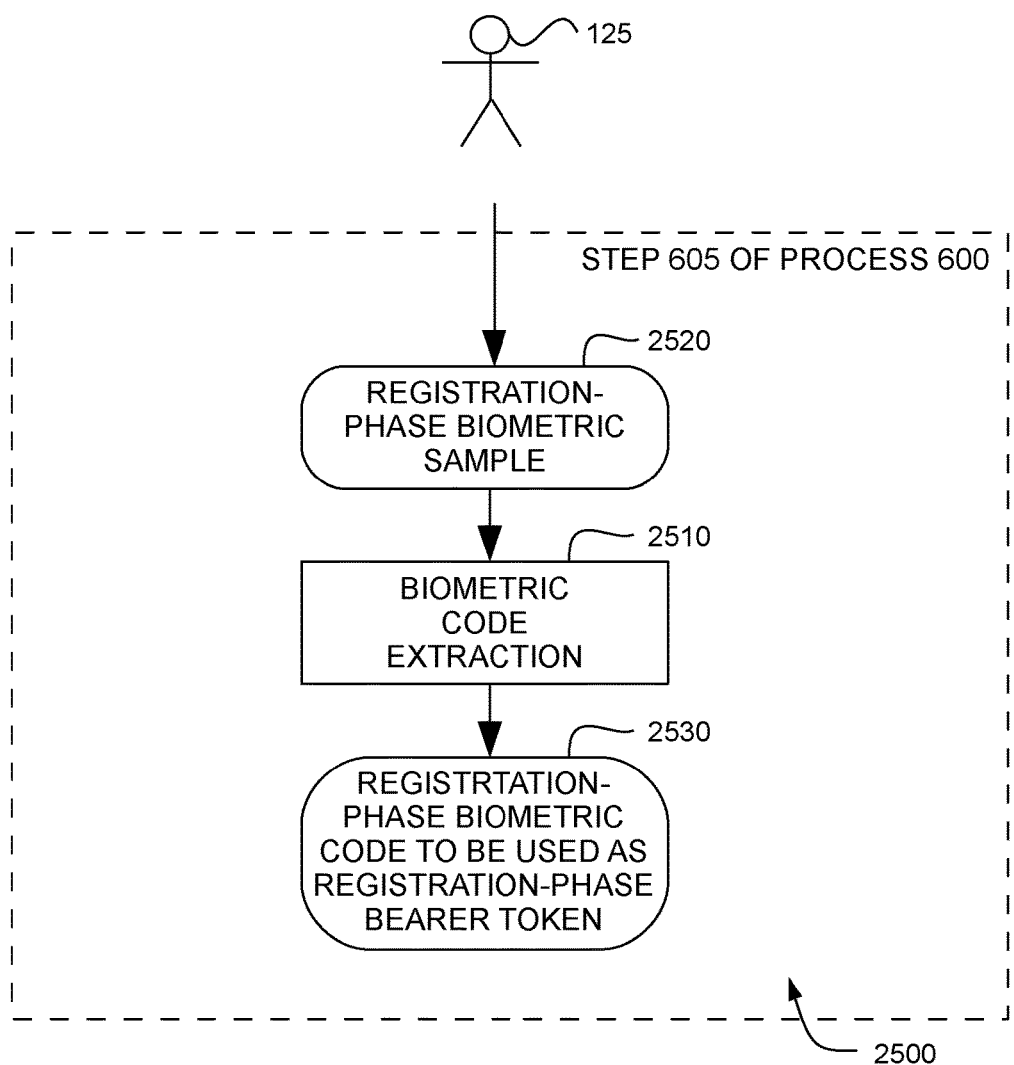
FIG. 25 is a dataflow diagram illustrating a process for obtaining a registration-phase bearer token consisting of a biometric code.

FIG. 25 is a dataflow diagram illustrating a process 2500 used by the application front-end 106 at step 605 of process 600 to obtain a registration-phase bearer token consisting of a biometric code, according to some embodiments.

At 2510 the application front-end processes a registration-phase biometric sample 2520 supplied by the user 125, extracting a registration-phase biometric code 2530 to be used as a regisration-phase bearer token.

Figure 26:
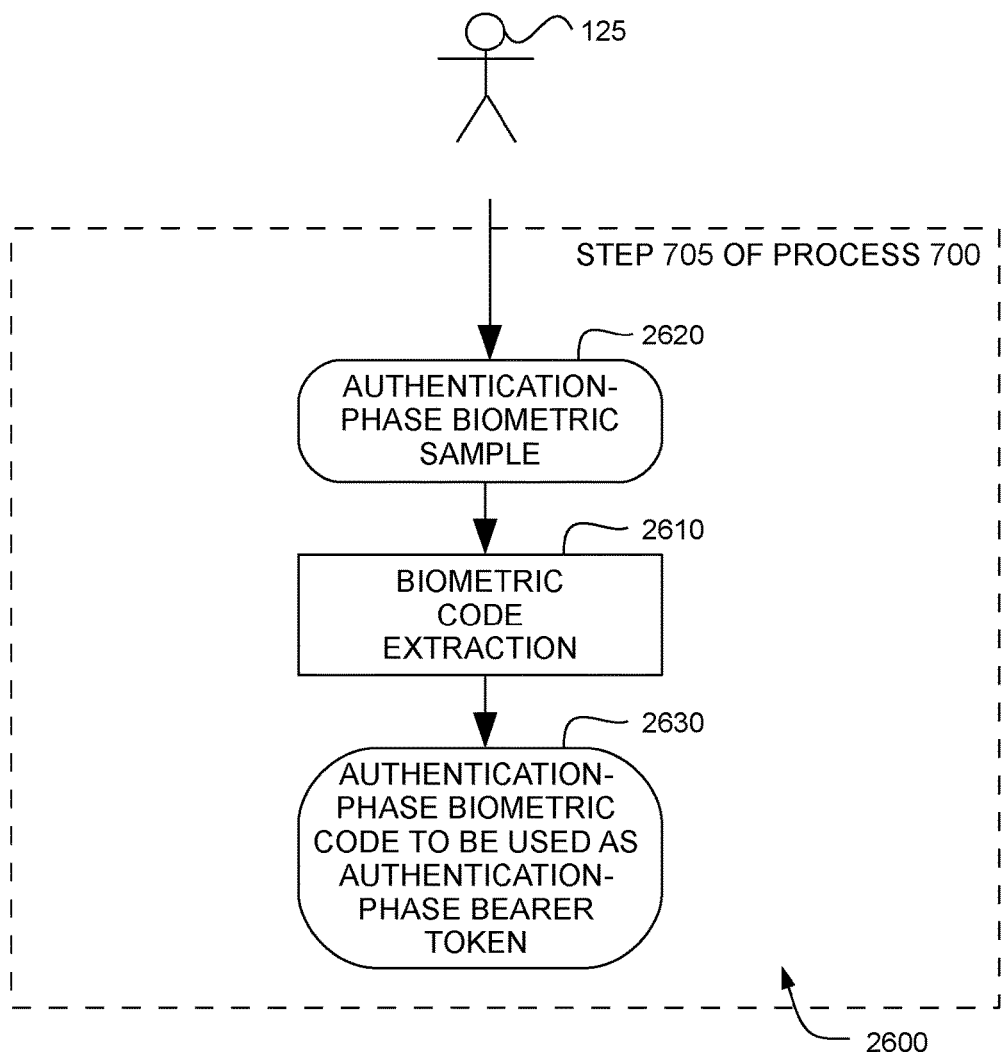
FIG. 26 is a dataflow diagram illustrating a process for obtaining an authentication-phase bearer token consisting of a biometric code.

FIG. 26 is a dataflow diagram illustrating a process 2600 used by the application front-end 106 to obtain an authentication-phase bearer token consisting of a biometric code at step 705 of process 700, according to the same embodiments illustrated in FIG. 25.

At 2610, the application front-end processes an authentication-phase biometric sample 2620 supplied by the user 125, extracting an authentication-phase biometric code 2630 to be used as an authentication-phase bearer token.

Figure 27:
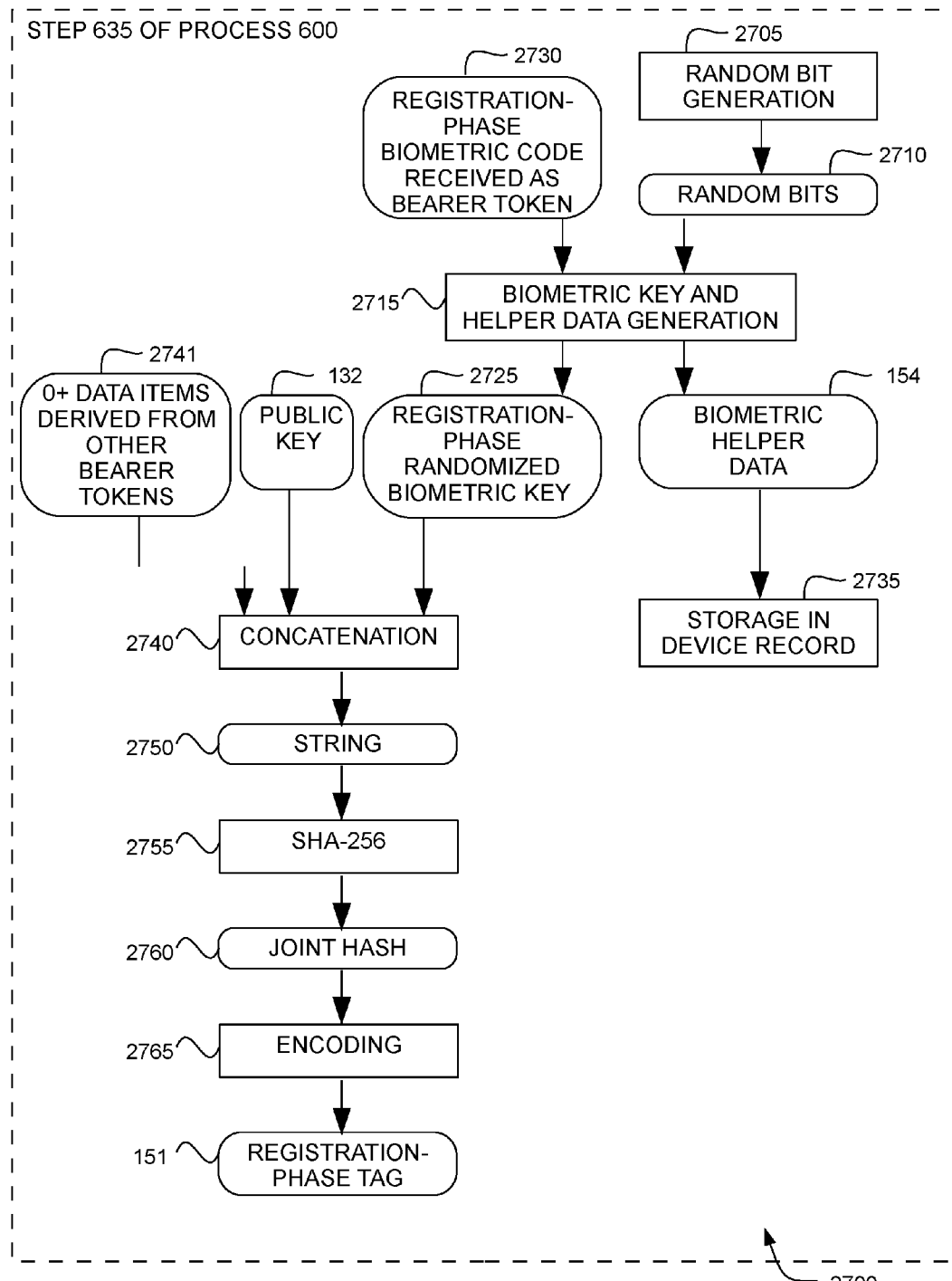
FIG. 27 is a dataflow diagram illustrating a process for computing a registration-phase tag derived from a joint hash of a public key and bearer tokens comprising a biometric code.

FIG. 27 is a dataflow diagram illustrating a process 2700 for computing the registration-phase tag 151 and storing biometric helper data in the device record 145 at step 635 of process 600, according to the same embodiments illustrated in FIGS. 25 and 26, wherein one of the registration-phase bearer tokens is a biometric code.

At 2705 the application back-end generates random bits 2710 using a random bit generator implemented as described in NIST Special Publications SP 800-90 A, B and C.

At 2715 the application back-end computes biometric helper data 154 and a registration-phase randomized biometric key 2725 from a registration-phase biometric code 2730 and the random bits, the registration-phase biometric code having been received by the application back-end from the application front-end as a registration-phase bearer token at step 620 of process 600.

At 2735 the application back-end stores the biometric helper data 154 in the device record 145 within the back-end storage medium 195.

At 2740 the application back-end concatenates the public key 132 received from the application front-end at step 625 of process 600, the randomized biometric key 2725 derived from the biometric code 2730, and zero or more data items 2741 derived from other registration-phase bearer tokens, producing a string 2750.

At 2755 the application back-end applies the cryptographic hash function SHA-256 to the string 2750, producing a joint hash 2760.

At 2765 the application back-end derives the registration-phase tag 151 from the joint hash, e.g. by applying an encoding such as a hexadecimal encoding, a base-64 encoding or a base-58 encoding. In some embodiments step 2765 is omitted, the registration-phase tag 151 being equal to the joint hash 2760.

Figure 28:
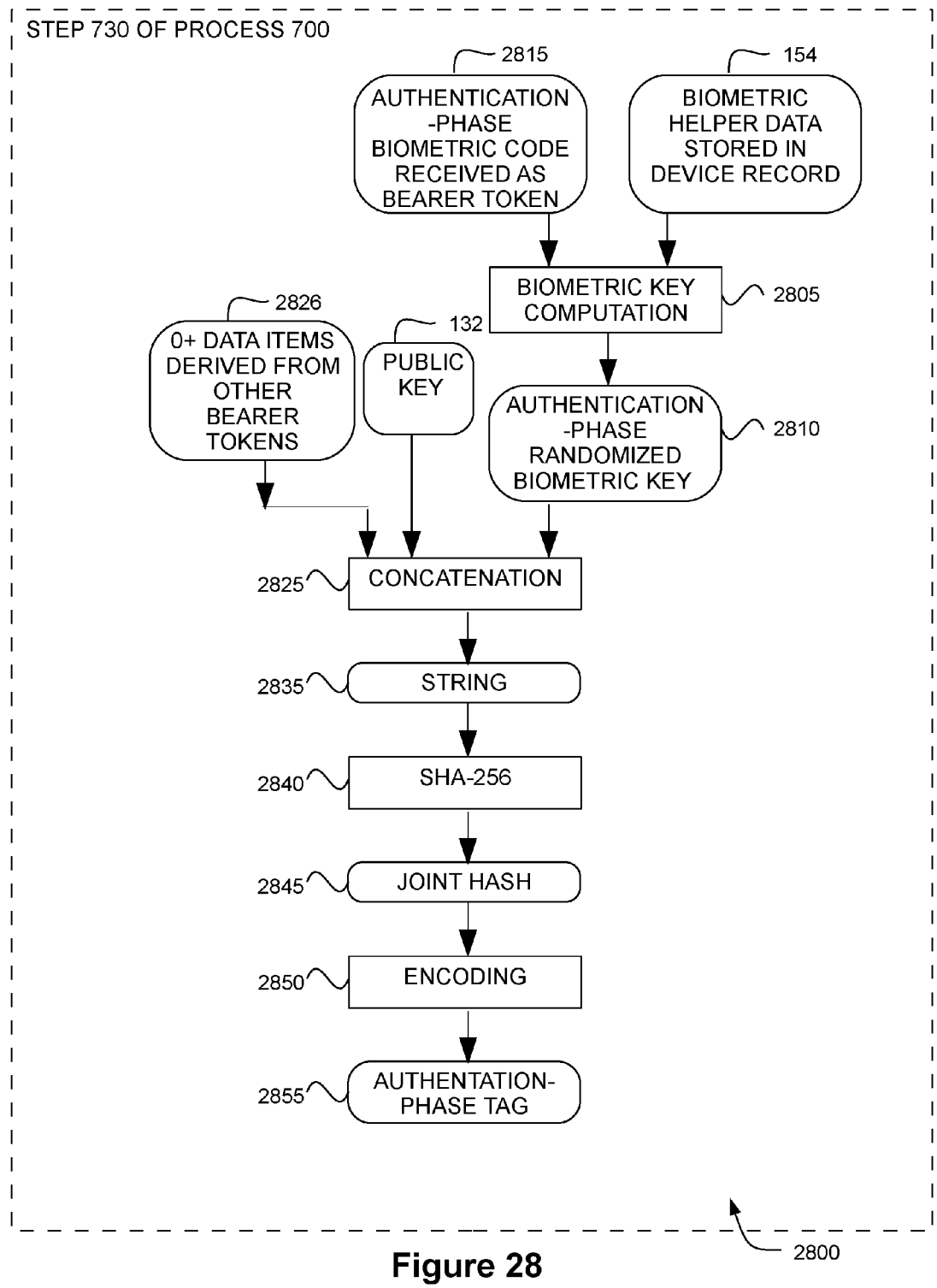
FIG. 28 is a dataflow diagram illustrating a process for computing an authentication-phase tag derived from a joint hash of a public key and bearer tokens comprising a biometric code.

FIG. 28 is a dataflow diagram illustrating a process 2800 used by the application back-end 107 to compute an authentication-phase tag at step 730 of process 700, according to the same embodiments illustrated in FIG. 27.

At 2805 the application back-end computes an authentication-phase randomized biometric key 2810 from an authentication-phase biometric code 2815 and biometric helper data 154 found in the device record 145, the authentication-phase biometric code having been received by the application back-end from the application front-end as an authentication-phase bearer token at step 715 of process 700.

At 2825 the application back-end concatenates the authentication-phase public key 132 received from the application front-end at step 725 of process 700, the randomized biometric key 2810 derived from the biometric code 2815, and zero or more data items 2826 derived from other authentication-phase bearer tokens, producing a string 2835.

At 2840 the application back-end applies the cryptographic hash function SHA-256 to the string 2835, producing a joint hash 2845.

At 2850 the application back-end derives the authentication-phase tag 2855 from the joint hash, e.g. by applying an encoding such as a hexadecimal encoding, a base-64 encoding or a base-58 encoding. In embodiments in which step 2765 of process 2700 is omitted, step 2850 is omitted as well, the authentication-phase tag 2855 being equal to the joint hash 2845.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A multifactor authentication method for authenticating a user of an application while mitigating back-end security breaches, the application comprising an application front-end running on a computing device and an application back-end running on a server, the server being part of a back-end subsystem, the back-end subsystem comprising a back-end storage medium, the method comprising:

during a registration phase, the application front-end sending to the application back-end one or more registration-phase bearer tokens;

during the registration phase, the application back-end computing a registration-phase tag derived from a registration-phase joint hash of a public key and the one or more registration-phase bearer tokens, the public key being a component of a key pair pertaining to an asymmetric cryptosystem, the public key being treated by the application as a secret shared between the application front-end and the application back-end, wherein the public key is never communicated by the application front-end or the application back-end to any third party;

during the registration phase, the application back-end storing the registration-phase tag in the back-end storage medium;

during the registration phase, the application back-end deleting the public key and the one or more registration-phase bearer tokens from the back-end subsystem after computing the registration-phase tag;

during an authentication phase, the application front-end sending to the application back-end the public key and one or more authentication-phase bearer tokens;

during the authentication phase, the application front-end proving to the application back-end knowledge of a private key associated with the public key, the private key being a component of the key pair;

during the authentication phase, the application back-end computing an authentication-phase tag derived from an authentication-phase joint hash of the public key and the one or more authentication-phase bearer tokens;

during the authentication phase, the application back-end deleting the public key and the one or more authentication-phase bearer tokens from the back-end subsystem after computing the authentication-phase tag; and during the authentication phase, the application back-end verifying that the authentication-phase tag is equal to the registration-phase tag.

2. The method of claim 1, wherein the public key and the associated private key pertain to an asymmetric digital signature cryptosystem and the application front-end proves knowledge of the private key to the application back-end by using the private key to compute a signature, the signature being verified by the application back-end.

3. The method of claim 1, wherein the public key and the associated private key pertain to an asymmetric key-exchange cryptosystem and the application front-end proves knowledge of the private key to the application back-end by using the private key to perform a key exchange with the application back-end.

4. The method of claim 1, wherein the public key and the associated private key pertain to an asymmetric encryption cryptosystem and the application front-end proves knowledge of the private key to the application back-end by using the private key to decrypt a nonce encrypted by the application back-end.

5. The method of claim 1, wherein one of the one or more registration-phase bearer tokens is a registration-phase password, and one of the one or more authentication-phase bearer tokens is an authentication-phase password.

6. The method of claim 1, wherein the application front-end is part of a front-end subsystem that comprises a front-end storage medium, and one of the one or more authentication-phase bearer tokens sent by the application front-end to the application back-end is derived from a joint hash of a salt stored in the storage medium and an authentication-phase password.

7. The method of claim 1, wherein one of the one or more authentication-phase bearer tokens is an authentication-phase biometric key.

8. The method of claim 1, wherein the application front-end is part of a front-end subsystem that comprises a front-end storage medium, and one of the one or more authentication-phase bearer tokens sent by the application front-end to the application back-end is derived from a joint hash of a salt stored in the front-end storage medium and an authentication-phase biometric key.

9. The method of claim 1, wherein one of the one or more authentication-phase bearer tokens is an authentication-phase biometric code and computing the authentication-phase tag comprises computing an authentication phase biometric key derived from the authentication-phase biometric code.

10. A system for authenticating a user while mitigating back-end security breaches, comprising:
   a computing device;
   a network;
   a server connected to the computing device by the network, the server being part of a back-end subsystem, the back-end subsystem comprising a back-end storage; and
   an application comprising an application front-end running on the computing device and an application back-end running on the server,
   wherein the application front-end and the application back-end jointly perform a method of authenticating a user of the application, the method comprising:
   during a registration phase, the application front-end sending to the application back-end one or more registration-phase bearer tokens;
   during the registration phase, the application back-end computing a registration-phase tag derived from a registration-phase joint hash of a public key and the one or more registration-phase bearer tokens, the public key being a component of a key pair pertaining to an asymmetric cryptosystem, the public key being treated by the application as a secret shared between the application front-end and the application back-end, wherein the public key is never communicated by the application front-end or the application back-end to any third party;
   during the registration phase, the application back-end storing the registration-phase tag in the back-end storage medium;
   during the registration phase, the application back-end deleting the public key and the one or more registration-phase bearer tokens from the back-end subsystem after computing the registration-phase tag;
   during an authentication phase, the application front-end sending to the application back-end the public key and one or more authentication-phase bearer tokens;
   during the authentication phase, the application front-end proving to the application back-end knowledge of a private key associated with the public key, the private key being a component of the key pair;
   during the authentication phase, the application back-end computing an authentication-phase tag derived from an authentication-phase joint hash of the public key and the one or more authentication-phase bearer tokens;
   during the authentication phase, the application back-end deleting the public key and the one or more authentication-phase bearer tokens from the back-end subsystem after computing the authentication-phase tag; and during the authentication phase, the application back-end verifying that the authentication-phase tag is equal to the registration-phase tag.

11. The system of claim 10, wherein one of the one or more registration-phase bearer tokens is a registration-phase password, and one of the one or more authentication-phase bearer tokens is an authentication-phase password.

12. The system of claim 10, wherein the application front-end is part of a front-end subsystem that comprises a front-end storage medium, and one of the one or more authentication-phase bearer tokens sent by the application front-end to the application back-end is derived from a joint hash of a salt stored in the storage medium and an authentication-phase password.

13. The system of claim 10, wherein one of the one or more authentication-phase bearer tokens is an authentication-phase biometric key.

14. The system of claim 13, wherein the authentication-phase biometric key is a randomized biometric key derived from an authentication-phase biometric code and biometric helper data.

15. The system of claim 10, wherein the application front-end is part of a front-end subsystem that comprises a front-end storage medium, and one of the one or more authentication-phase bearer tokens sent by the application front-end to the application back-end is derived from a joint hash of a salt stored in the front-end storage medium and an authentication-phase biometric key.

16. The system of claim 15, wherein the authentication-phase biometric key is a randomized biometric key derived from an authentication-phase biometric code and biometric helper data.

17. The system of claim 10, wherein one of the one or more authentication-phase bearer tokens is an authentication-phase biometric code and computing the authentication-phase tag comprises computing an authentication phase biometric key derived from the authentication-phase biometric code.

18. The system of claim 17, wherein the authentication-phase biometric key is a randomized biometric key that is further derived from biometric helper data.

\* \* \* \* \*